US006438603B1

(12) United States Patent
Ogus

(10) Patent No.: US 6,438,603 B1
(45) Date of Patent: Aug. 20, 2002

(54) METHODS AND PROTOCOL FOR SIMULTANEOUS TUNING OF RELIABLE AND NON-RELIABLE CHANNELS OF A SINGLE NETWORK COMMUNICATION LINK

(75) Inventor: Aaron W. Ogus, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/302,559

(22) Filed: Apr. 30, 1999

(51) Int. Cl.$^7$ ................................................ G06F 13/00
(52) U.S. Cl. ...................... 709/233; 709/232; 709/238; 709/239; 370/238
(58) Field of Search ................................ 709/238, 239, 709/237, 233, 232; 370/238

(56) References Cited

U.S. PATENT DOCUMENTS

| | | | | |
|---|---|---|---|---|
| 4,725,834 A | * | 2/1988 | Chang et al. ............. | 340/825.5 |
| 4,926,446 A | * | 5/1990 | Grover et al. ............... | 375/358 |
| 5,400,329 A | * | 3/1995 | Tokura et al. ............... | 370/232 |
| 5,870,557 A | * | 2/1999 | Bellovin et al. ............ | 709/224 |
| 6,061,722 A | * | 5/2000 | Lipa et al. ................... | 709/224 |
| 6,075,769 A | * | 6/2000 | Ghanwani et al. .......... | 370/229 |
| 6,240,462 B1 | * | 5/2001 | Agraharam et al. ........ | 709/238 |
| 6,310,892 B1 | * | 10/2001 | Olkin ......................... | 370/473 |

OTHER PUBLICATIONS

Yu, Alex, Large Internet Packet, Packet Burst Protocol and Sliding Window, http://seamonkey.ed.asu.edu/ alex/computer/novell/LIP PBP.html, printed from the Internet Jul. 22, 1999.

Van Jacobsen and Michael J. Karels, "Conjestion Avoidance and Control," SIGCOMM '88[11], Nov., 1988, pp. 1–21.

Lawrence S. Brakmo, Sean W. O'Malley, and Larry L. Peterson, "TCP Vegas: New Techniques for Congestion Detection and Avoidance," Dept. of Computer Science, University of Arizona, SIGCOMM '93.

"USC Experiment with TCP Vegas: Emulation and Experiment", http://excalibur.usc.edu/research/vegas/doc/vegas.html, pp. 1–2, printed from the Internet Jul. 22, 1999.

(List continued on next page.)

Primary Examiner—Kenneth R. Coulter
(74) Attorney, Agent, or Firm—Klarquist Sparkman, LLP

(57) ABSTRACT

An application layer protocol supports reliable and non-reliable message transfer between a local and remote computer on a shared communications link. The application layer protocol uses a non-reliable transport layer protocol to implement both reliable and non-reliable channels over the shared link. When application programs want to send reliable data messages, they designate the data as such, and the application layer protocol sends the data in reliable messages with a request for acknowledgement. When application programs want to send non-critical data, they designate the data as such, and the application layer protocol sends the data in non-reliable messages that are not re-sent when dropped. Though it does not ensure delivery of non-reliable messages, the application layer selectively uses a request for acknowledge for non-reliable messages to gather operational data about the link. The protocol uses requests for acknowledgement for the dual purpose of ensuring reliable delivery for reliable messages and maintaining operational characteristics used to tune the link. In particular, the protocol uses the operational characteristics to detect link saturation, to calculate outbound bandwidth, to calculate a wait time for clearing backlogged messages and for adjusting the send rate based on the calculated bandwidth. This scheme enables the protocol to adapt the send rate based on varying link conditions.

20 Claims, 15 Drawing Sheets

OTHER PUBLICATIONS

"TCP Vegas: New Techniques for Congestion Detection and Avoidance", http://netweb.usc.edu/yaxu/Vegas/Html/vegas.html, pp. 1–3., printed from the Internet Jul. 22, 1999.

*Apple Game Sprockets Guide*, ©Apple Computer, Inc. 1996, pp. 1–21.

"Transmission Control Protocol Darpa Internet Program Protocol Specification", Prepared for Defense Advanced Research Projects Agency, Sep. 1981, http://deesse.univ-lemans.fr:8003/Conhected/RFC/793.index.html, http://deesse.univ–lemans.fr:8003/Conhected/RFC/793.13.html, http://deesse.univ–lemans.fr:8003/Conhected/RFC/793.21.html, printed from the Internet Jul. 22, 1999.

V. Jacobsen, Braden, R., and D. Borman, "TCP Extensions for High Performance," http://netweb.usc.edu/yaxu/Vegas/Reference/rfc1323.txt, pp. 1–33, printed from the Internet Jul. 22, 1999.

IDirectPlay4, http://msdn.microsoft.com/library/sdkdoc/directx/cpp dpref 9qd5.htm.

IDirectPlay4:Send, http://msdn.microsoft.com/library/sdkdoc/directx/cpp dpref 6dvd.htm.

IDirectPlay4:Receive, http://msdn.microsoft.com/library/sdkdoc/directx/cpp dpref 9hrt.htm.

TCP/IP, http://msdn.microsoft.com/library/sdkdoc/directx/cpp dpover 9eih.htm.

DirectPlay Protocol, http://msdn.microsoft.com/library/sdkdoc/directx/cpp dpover 9qux.htm.

Asynchronous Networking with the DirectPlay Protocol, http://msdn.microsoft.com/library/sdkdoc/directx/cpp dpover 7k8p.htm, printed from the Internet Jul. 22, 1999.

H. Schulzrinne, S. Casner. R. Frederick, and V. Jacobsen, "RTP: A Transport Protocol for Real–Time Applications," http://www2.hunter.com/docs/rfc/rfc1889.html, Jan. 1996, pp. 1–58.

"Experience with TCP Vegas from SunOS 4.1.3 to NetBSD 1.0," http://netweb.usc.edu/yazu/Vegas/Html/vegas.html, pp. 1–3, printed from the Internet Jul. 22, 1999.

A collection of papers on TCP Vegas, http://netweb.usc.edu/yaxu/Vegas/Reference/index.html printed from the Internet Jul. 22, 1999.

Brakmo, et al. "TCP Vegas: End to End Congestion Avoidance on a Global Internet," *IEEE Journal on Selected Areas in Communications*, 13(8):1465–1480, Oct. 1995.

Ahn, et al. "Evaluation of TCP Vegas: Emulation and Experiment," http://excalibur.usc.edu/research/vegas./oc/vegas.html, pp. 1–11, SIGCOMM'95, 1995.

Xu, et al. "TCP Vegas: The Vegas/NetBSD Project," cover page and pp. 1–22, Nov. 15, 1995.

* cited by examiner-

METHODS AND PROTOCOL FOR SIMULTANEOUS TUNING OF RELIABLE AND NON-RELIABLE CHANNELS OF A SINGLE NETWORK COMMUNICATION LINK

RELATED APPLICATION DATA

This patent application is related to the following co-pending U.S. patent application Ser. No. 09/303,067, which is commonly assigned and is hereby incorporated by reference: Network Protocol And Associated Methods For Optimizing Use Of Available Bandwidth by Aaron W. Ogus, filed concurrently with this application.

FIELD OF THE INVENTION

The invention pertains to computer network protocols and computer programs that implement such protocols.

BACKGROUND OF THE INVENTION

There are many instances in which it would be advantageous to be able to advance and retard data transfer rates during network data transmissions to make full use of the available bandwidth based on the current network traffic. One such instance occurs when multi-player games are played over a network, such as the Internet. The executable code for these games are often located on network servers that are accessible through various networks, such as the Internet. Alternately, some or all of the executable code for the games may be located on each of computers the players are using. One or more players can log on to the game and play against the game itself (a computer) or each other. These games typically comprise an ever-changing graphical environment that is primarily controlled by the control inputs of the various game players. For example, a game may involve several warriors facing off against one another, with one or more of the warriors being controlled by each player (or a computer). In such a game, the movements of each warrior relative to the graphical environment and the other warriors will depend on the control inputs of the players (or automated movements by the computer). For this reason, it is highly desired to transfer the user-input information to the game as rapidly as possible so that the inputs for the various players can be immediately reflected by updating the graphics displayed on each player's screen.

To understand why rapid data transfer is so desirable, consider a situation in which the data transfer carries a substantial delay. Player A activates her controls to cause one of her warriors to throw a spear at an enemy warrior. Player A aims the spear based on her perception of the current state of the game, i.e., what she sees on her screen. If the data transfer rate is rapid, the display each player sees accurately reflects (is synchronous with) the current state of the game. Conversely, if the data transfer carries a delay, the display each player sees does not accurately reflect the present game state—that is, the displays observed by the various players will not be synchronized. Under such circumstances, the players may miss their targets due to the program's inaccurate display of the positions of the other participants. This delay may also cause players to be unaware of an attack in progress from another player. Transfer delays of this type are frequently encountered when networked games are played, creating unsatisfactory game performance. A principle reason for this is conventional program development tools do not provide a built-in interface that allows the data transfer rate to be adjusted to optimize bandwidth use under varying link conditions.

Developers of multi-player networked game applications typically design games to support presumed worst-case bandwidth situations. As a result, the bandwidth usage between machines is limited to a fraction of the bandwidth available over the network link, which results in non-optimal game performance. Under such worst-case-scenario design practices, the game developer assumes a minimum available link bandwidth, such as 14.4 or 28.8 kilobaud (kilobits per second), and a maximum number of players the game will support or likely encounter. The developer may also determine the average (or maximum) size of each message that the game will transfer over the network (which she typically will seek to minimize). The developer will then calculate a maximum message sending rate based on this predetermined criteria, and the game application will send messages at this calculated transfer rate. For example, in a peer-to-peer game, where messages are distributed to all players from each machine, the following equation can be used to determine the maximum sending rate:

$$R = \frac{bw}{cb*(n-1)} \qquad (1)$$

wherein R is the maximum message sending rate in messages per second, n is the number of players in the game, cb is the number of bytes in a message, and bw is the assumed bandwidth.

Unfortunately, the use of static calculations of this sort leads to a number of problems, including: (1) the application can't compensate for variation in headers due to the underlying transport; (2) the application will under-utilize the link in situations where more bandwidth is available than originally presumed; and (3) the application will not be able to adjust the message sending rate to compensate for other traffic on the link. In addition, when the conditions on the link are actually worse than the initial assumptions, sending messages at the statically-determined rate will lead to the link being backlogged. That is, the rate at which the application sends messages may exceed the link's capabilities, causing messages to build up in the sending computer or on a router in the network, resulting in increased apparent latency that can grow without bound, eventually making the game unplayable and ultimately causing the link to timeout.

Some multi-user applications send data to remote computers using a non-reliable transport. A non-reliable transport is a transport that does not guarantee delivery. While such protocols eliminate the overhead associated with ensuring delivery of a message, they have the significant drawback that any message may not reach its destination. This particularly is a problem when the lost message contains critical game-state information. One way to address this problem is to send messages over two separate logical links, where critical messages are sent using a reliable transport, and non-critical messages are sent using a non-reliable transport.

Such a scheme is illustrated in FIG. 7, where an application 302 sends both critical messages 304 and non-critical messages 306. The critical messages 304 are sent over a reliable transport such as TCP transport layer protocol 308, which operates on top of an IP network layer protocol 310. The combined services of the TCP protocol 308 and the IP protocol 310 support a reliable communications link 312. Conversely, non-critical messages 306 are sent over a non-reliable transport such as the UDP transport layer protocol 314, which also operates on top of an IP network layer protocol 316 to support a non-reliable communications link 318.

A primary drawback of the FIG. 7 scheme is that it requires two distinct protocols at the transport layer, namely TCP and UDP. TCP and UDP provide different services implemented in distinct programs. When used to send data between local and remote application programs, each operates independently. In particular, when a local application program wants to send critical data via TCP and non-critical data via UDP, it invokes the TCP and UDP protocols separately. In these circumstances, the TCP and UDP protocols operate independently and do not share operational data. The operation of one protocol can impact the operation of another protocol. For example, the available bandwidth that the TCP protocol will experience varies depending on whether the UDP protocol is sending messages at the same time. Since the protocols do not share operational data, the UDP protocol has no way to get operational data from the TCP protocol. As such, the local computer has no mechanism for effectively tuning the send rate across concurrently executing protocols.

SUMMARY OF THE INVENTION

The invention addresses these and other drawbacks by providing a network communication protocol that allows application programs to send messages over both reliable and non-reliable channels that share a single communications link. The protocol and related methods additionally allow simultaneous tuning of both channels to optimize the available network bandwidth under varying network conditions. The network protocol is preferably implemented as an application program interface (API) that allows programmers to use features of the invention through a set of API calls. The network protocol resides at the application layer, providing an interface to the underlying transport services so that the application program does not need to be concerned with how messages are being transported.

In one aspect of the invention, the network protocol enables application programs to use a reliable channel and a non-reliable channel over the same network communications link between a local and remote computer. The network protocol facilitates reliable and non-reliable channels on a single network link with a set of message header data structures, the first header being used for outbound and resend messages, and the second header for acknowledge messages. The outbound message header includes an acknowledge request field used to signal the remote computer to send an acknowledgment message indicating that it has successfully received the corresponding outbound message from the local computer.

The network protocol in the local computer uses the acknowledge field to ensure that messages sent over the reliable channel are received. In addition, it uses the acknowledge field for messages sent over the reliable and non-reliable channels to maintain operational data used to tune the network communications link shared by both of these channels. To support reliable transfer, the network protocol monitors for proper acknowledgement and resends reliable messages that are not properly acknowledged (e.g., dropped messages). In contrast, the network protocol does not monitor non-reliable messages for drops, nor re-transmit them. To facilitate network tuning, the network communication protocol uses data from the acknowledge messages of selected reliable and non-reliable messages to gather operational data about the shared link, including data used to detect link saturation, calculate outbound bandwidth, and adjust the message send rate. Both the reliable and non-reliable channels share the same link by using the same transport layer protocol, preferably a datagram protocol such as UDP.

In another aspect of the invention, the network protocol determines the available bandwidth on this shared link. In response to requests from an application program, the network communication protocol sends critical data over the reliable channel and non-critical data over the non-reliable channel of the shared link. To maintain operational characteristics about the link, the network protocol requests an acknowledge message for certain outbound messages, including selected reliable messages and non-reliable messages sent on the shared link. Each of these outbound messages is timestamped with the time the message was sent according to the local computer's clock, and includes a message identifier. Each acknowledge message is timestamped with the time it is sent from the remote computer, and includes a count of the data (e.g., count of bytes) received for the outbound message and an identifier that matches the message identifier of the outbound message that it corresponds to. The message identifier is used to ensure that the acknowledgement messages are correctly matched with outbound messages.

The network protocol maintains a variety of operational characteristics of the shared link. For example in the current implementation, it calculates a clock bias between the clocks of the local and remote computers based on the time the outbound messages are sent and the time they are received by comparing the outbound message timestamps to the acknowledge message timestamps. The rate that all messages (including the reliable and non-reliable messages) are sent is increased until the link becomes saturated, which is detected by observing an increase in a measure of the round-trip latency and changes in the clock bias. At link saturation, the network protocol tracks the total data received in the remote computer between two acknowledge messages. It then calculates the outbound bandwidth of the link by dividing the data received in the remote computer by the time over which that data was received.

The network protocol and associated methods allow application programs to maximize the use of available network bandwidth, thereby improving the performance of the programs' communications. The network protocol sends reliable and non-critical messages over respective reliable and non-reliable channels that share a network link. While sending these messages, the network protocol increases the send rate of the messages according to a predetermined scheme until it detects link saturation. The protocol also continuously pushes up the send rate until message dropouts are detected, at which point it makes a step reduction of the send rate, and starts pushing up the send rate again. The link saturation and detection may also result from increased link usage by other users on the network. At link saturation, the protocol calculates the outbound bandwidth of the link, and reduces the message send rate to the calculated bandwidth. It also calculates a wait time to clear backlogged messages. After the wait time, the protocol sets the message send rate to the calculated bandwidth, and resumes the sending of messages. The process preferably is repeated on a continual basis so as to adjust the message send rate to take advantage of the latest bandwidth and backlog measurements.

The foregoing methods can also be utilized in scenarios where more than two computers are linked in communication across a network, such as the case that exists when multiple players in a peer-to-peer relationship to one another are playing a game over a network. The message send rate can be tuned for each peer-to-peer relationship, maximizing the use of available bandwidth across the peer-to-peer link.

Further advantages and features of the invention will become apparent with reference to the following detailed description and accompanying drawings.

DETAILED DESCRIPTION

In order to transfer data over a network, it is necessary to have a set of rules so that every portion of the transfer sequence is properly executed. Each of these rules is called a protocol, and a set of rules is called a protocol suite. The most common set of protocols that are used when transferring data over the Internet and various other networks such as LANs (local area networks) and WANs (wide area networks) is provided by the TCP/IP protocol suite (Transmission Control Protocol/Internet Protocol). The TCP/IP protocol suite allows a variety of different types of computers, running different operating systems, to communicate with each other. TCP/IP forms the basis for the worldwide Internet (Internet), a wide area network of more than one million computers that literally spans the globe. It is common to refer to a protocol suite by its acronym alone, e.g. TCP/IP, or by the acronym followed by "protocol", e.g., the TCP/IP protocol.

The are many other network protocol suites in addition to the TCP/IP suite, including IPX/SPX (Internet Packet Exchange/Sequenced Packet Exchange), and NetBios. Although originally developed by independent research groups, most network protocols are open (non-proprietary) standards, many of which are published as a series of numerically-ordered RFC (Request for Comment) papers. For example the IP protocol is RFC 791. The RFC papers are readily available on the Internet or at a various libraries.

Although distinct, each of these network protocol suites are similar in structure, comprising a set of layers, with each layer responsible for a different facet of the communication task. For simplicity, the discussion below will primarily pertain to the use of the invention when using the TCP/IP protocol. However, it should be recognized by those skilled in the art that although the principles of the invention are described in reference to the TCP/IP protocol, the invention can also be applied to various other network protocols as well.

Figure 1:
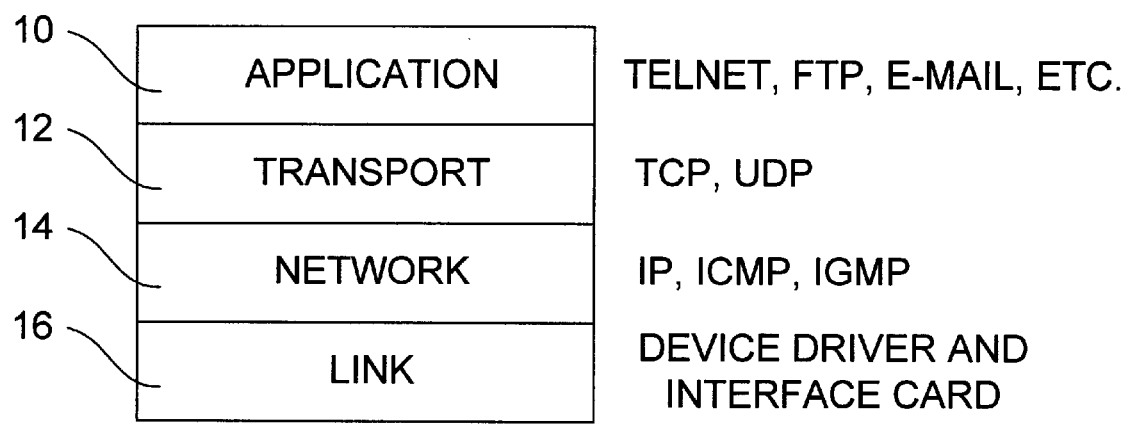
FIG. 1 shows the four layers of the TCP/IP protocol suite.

As shown in FIG. 1, TCP/IP is normally considered to be a 4-layer system comprising an application layer 10, a transport layer 12 a network layer 14, and a link layer 16. Each layer is responsible for handling various tasks, as follows.

The link layer 16 (also referred to as the data-link layer or the network interface layer) normally includes the device driver in the operating system and the corresponding network interface card in the computer. Together they handle all the hardware details of physically interfacing with the network media being used, e.g. Ethernet cable, etc.

The network layer 14 (also referred to as the internet layer) handles the movement of packets of data around the network. For example, the network layer handles the routing of the various packets of data that are transferred over the network. The network layer in the TCP/IP suite is comprised of several protocols, including IP (Internet Protocol), ICMP (nternet Control Message Protocol), and IGMP (Internet Group Management Protocol).

The transport layer 12 provides an interface between the network layer 14 and the application layer 10 that facilitates the transfer of data between two host computers. In the TCP/IP protocol suite there are two distinctly different transport protocols: TCP (Transmission Control Protocol) and UDP (User Datagram Protocol). TCP provides a reliable flow of data between two hosts. It is concerned with things such as dividing the data passed to it from the application into appropriately sized chunks for the network layer below, acknowledging received packets, setting timeouts to make certain the other end acknowledges packets that are sent, etc. When using TCP, the application layer can ignore all these reliability details since they are handled by the transport layer. Conversely, UDP provides a much simpler service to the application layer. It merely sends packets of data called datagrams from one host to the other, without providing any mechanism for guaranteeing that the data is properly transferred. The reliability functionality must be performed by the application layer when using UDP.

The application layer handles the details of the particular application. There are many common TCP/IP applications that almost every implementation provides, including (1) Telnet for remote login; (2) FTP, the File Transfer Protocol; (3) SMTP, the Simple Mail Transfer protocol, for electronic mail, and (4) SNMP, the Simple Network Management Protocol.

Figure 2:
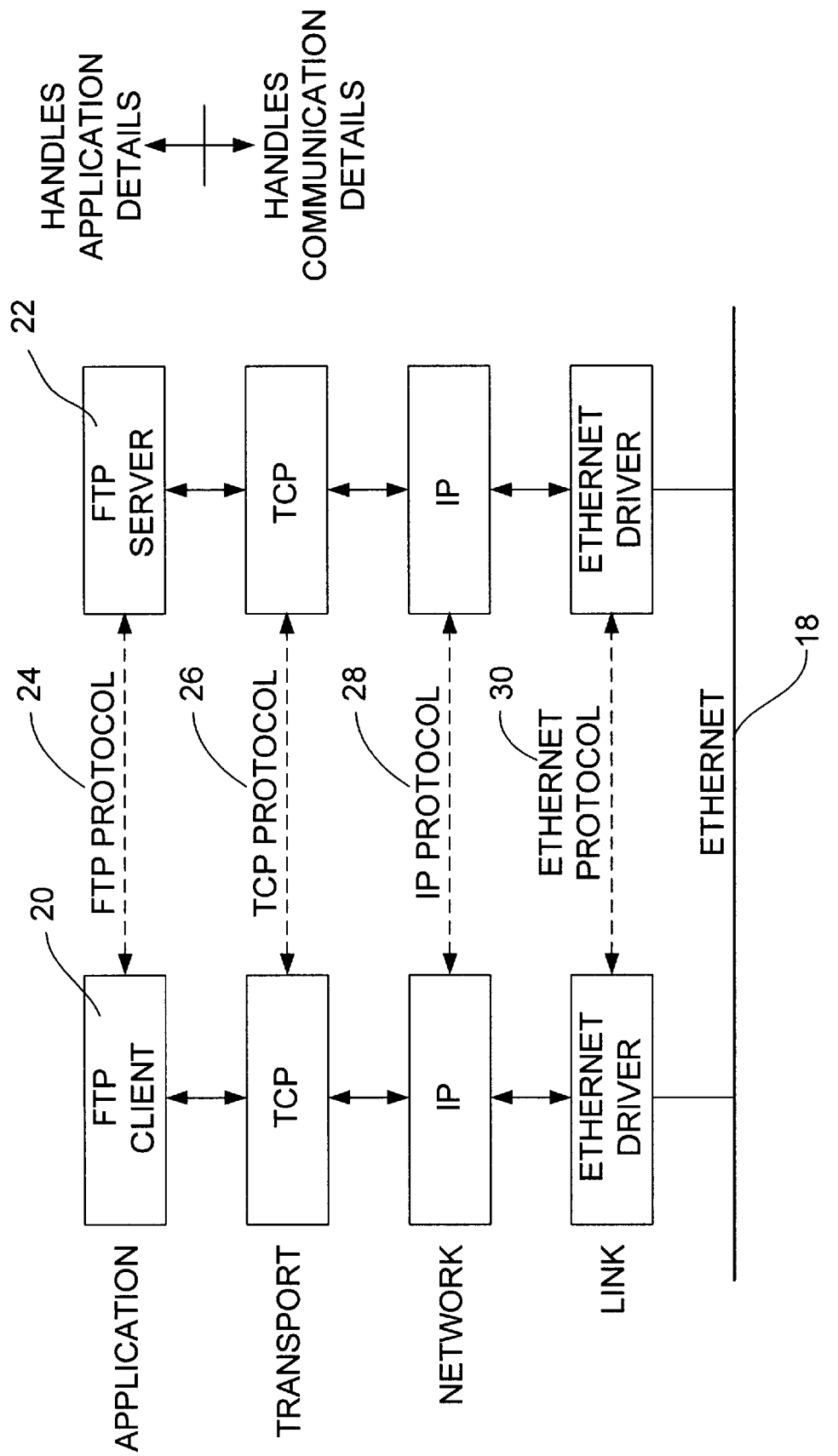
FIG. 2 shows the protocols that are used under TCP/IP when two hosts on a LAN are running FTP.

FIG. 2 shows the protocols of a simple network comprising two Ethernet hosts on an Ethernet LAN 18, both running FTP. At the application layer, the network comprises an FTP client 20 and an FTP server 22. Most network applications are designed so that one end is the client and the other side is the server. The server provides some type of services to various clients, in this case, access to files on the server host.

Each layer has one or more protocols for communicating with its peer at the same layer. These communication protocols include the FTP protocol 24 at the application layer, the TCP protocol 26 at the transport layer, the IP protocol 28 at the network layer, and the Ethernet protocol 30 at the link layer. It is common for the application layer to handle user processes, while the lower three layers (transport, network and link) are implemented in the kernel of the operating system, such as UNIX or the Windows NT® operating system. In addition, the application layer is only concerned with the details of the application and is not concerned with the details of the movement of data across the network. Conversely, the lower three layers are only concerned with the communication details and usually know nothing about the application. For example, the purpose of the network interface layer is to handle the details of the communication media (Ethernet, token ring, etc.), while the purpose of the application layer is to handle one specific user application (FTP, Telnet, etc.).

Computer networks have developed from simple LANs comprising a handful of computers to complex WANs comprising a network of networked computers. The first computer networks were motivated by the realization that it would be advantageous to provide communication links between stand-alone computers. The concepts used in these original networks have fueled the development of today's internets, which comprise a network of networks that use the same protocol suite. Such internets allow a computer on one network to communicate with any one or more computers on the other networks, allowing the data across all of the computers comprising all of the networks to be shared.

Figure 3:
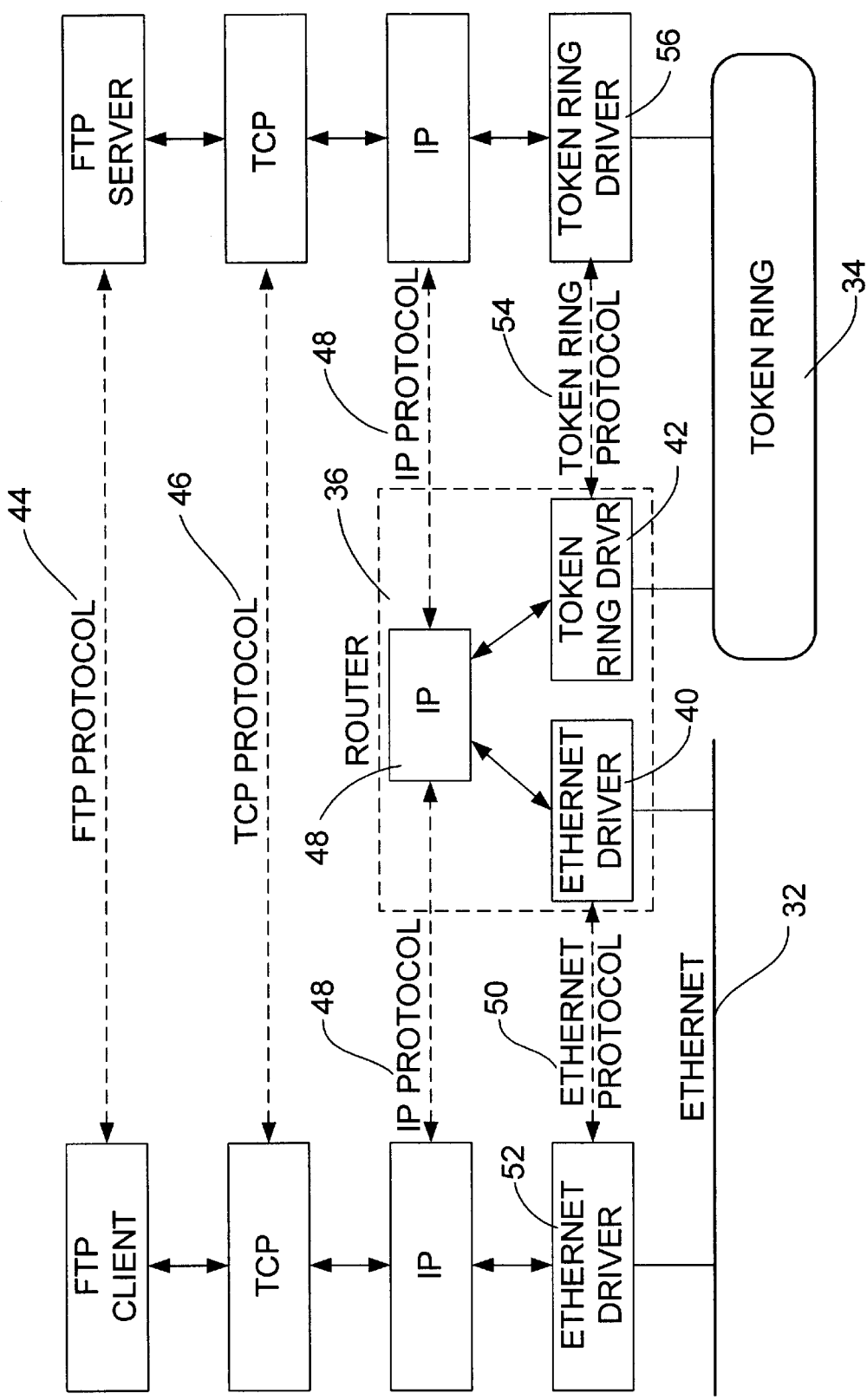
FIG. 3 shows the protocols that are used under TCP/IP when Ethernet and token ring networks are connected with a router.

The easiest way to build an internet is to connect two or more networks together with a router. Typical routers comprise a special-purpose hardware box with input and output connections and dedicated hardware and/or embedded software that allow many different types of physical networks to be connected, such as Ethernet, token ring, point-to-point links, etc. FIG. 3 shows an internet comprising an Ethernet network 32 connected to a token ring network 34 by a router 36. Although FIG. 3 only shows two hosts in communication, any host on the Ethernet network can communicate with any host on the token ring network. The router 36 comprises a network layer module 38 (an IP module in this case), and appropriate network drivers for connecting to the host networks, namely an Ethernet driver 40 and a token ring driver 42.

As shown in FIG. 3, a different communication construct is used between an end system (the two hosts on either side) and an intermediate system (the router in the middle) than was shown in the FIG. 2 network. The application layer and the transport layer use end-to-end protocols (FTP protocol 44, TCP protocol 46). The network layer provides a hop-to-hop protocol that is used on the two end systems and every intermediate system in between (for clarity only one intermediate system is shown here). For instance, the IP module 38 of the router 36 is connected to the two hosts by IP protocols 48. There are also link layer protocols that are specific to the various types of host networks that are connected to the router to handle communication between the networks and the router at the link layer. Thus, an Ethernet protocol 50 is used to handle communications between the Ethernet driver 40 in the router 36 and the Ethernet driver 52 of the hosts on the Ethenet network 32, while a token ring protocol 54 is used to handle communications between the token ring driver 42 of the router 36 and the token ring driver 56 of the hosts on the token ring network 34.

In the TCP/IP protocol suite the network layer, IP, provides an unreliable service. It's job is to move a packet of data from a source to a destination, but it provides no mechanism for guaranteeing delivery, or even being able to determine if a proper transfer has occurred. This is where the TCP layer comes into play. TCP provides reliability services to ensure that data is properly transmitted between two hosts, including dropout detection and retransmission services.

A router has two or more network interface layers (since it connects two or more networks). Any system with multiple interfaces is called multihomed. A host can also be multihomed, but unless it specifically forwards packets from one interface to another, it is not called a router. Also, routers need not be special hardware boxes that only move packets around an internet. Most TCP/IP implementations allow a multihomed host to act as a router, but the host needs to be specifically configured to support this use. In such instances, we can call the system either a host (when an application such as FTP or Telnet is being used) or a router (when it's forwarding packets from one network to another.

Another way to connect networks is with a bridge. Bridges connect networks at the link layer, while routers connect networks at the network layer. Bridges make multiple LANs appear to the upper layers as a single LAN.

One of the most powerful features of an internet is the ability to hide all the details of the physical layout of the internet from the applications. This allows the application layer to be oblivious to the underlying structure of the network; in fact, it can't and doesn't care if there is a pair of networks connected by a single router, or a multitude of routers and bridges connecting multiple physically-distinct networks.

Figure 4:
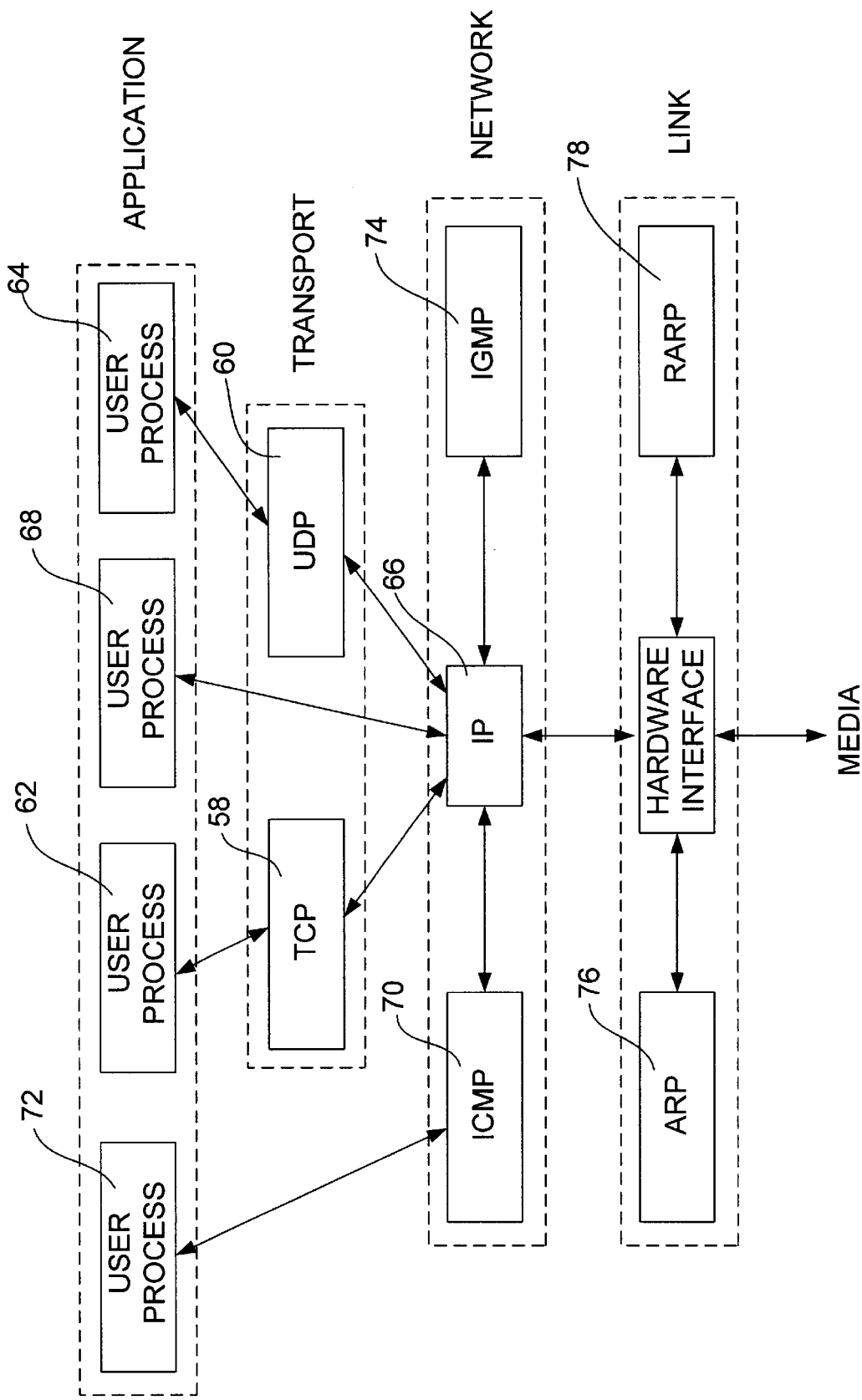
FIG. 4 shows various protocols at the different layers of the TCP/IP protocol suite.

In addition to the foregoing protocols, the TCP/IP suite includes a variety of other protocols, several of which are shown in FIG. 4. As discussed above, the primary transport layer protocols are TCP protocol 58 and UDP protocol 60. User processes 62, 64 at the application layer, respectively, use TCP services when reliable transport is required, and use UDP services when reliable service is unnecessary. Both TCP 58 and UDP 60 use the IP layer 66, the main protocol at the network layer. Every piece of TCP and UDP data that gets transferred around an internet goes through the IP layer at both ends of a link system and at every intermediate router. It is also possible (but rare) for a user process to access IP directly, as is the case with user process 68.

The network layer includes protocols in addition to IP. One such network protocol is the Internet Control Message Protocol (ICMP) 70, which is an adjunct to the IP protocol 66. ICMP is used by the IP layer to exchange error messages and other vital information with the IP layer in another host or router. The ICMP protocol may be accessed from a user process directly, as is shown with user process 72. Another network level protocol is the Internet Group Management Protocol (IGMP) 74. IGMP is used with multicasting, i.e., sending a UDP datagram to multiple hosts.

ARP (Address Resolution Protocol) 76 and RARP (Reverse Address Resolution Protocol) 78 are specialized protocols used only with certain types of network interfaces (such as Ethernet and token ring) to convert between the addresses used by the IP layer and the addresses used by the network interface.

Figure 5:
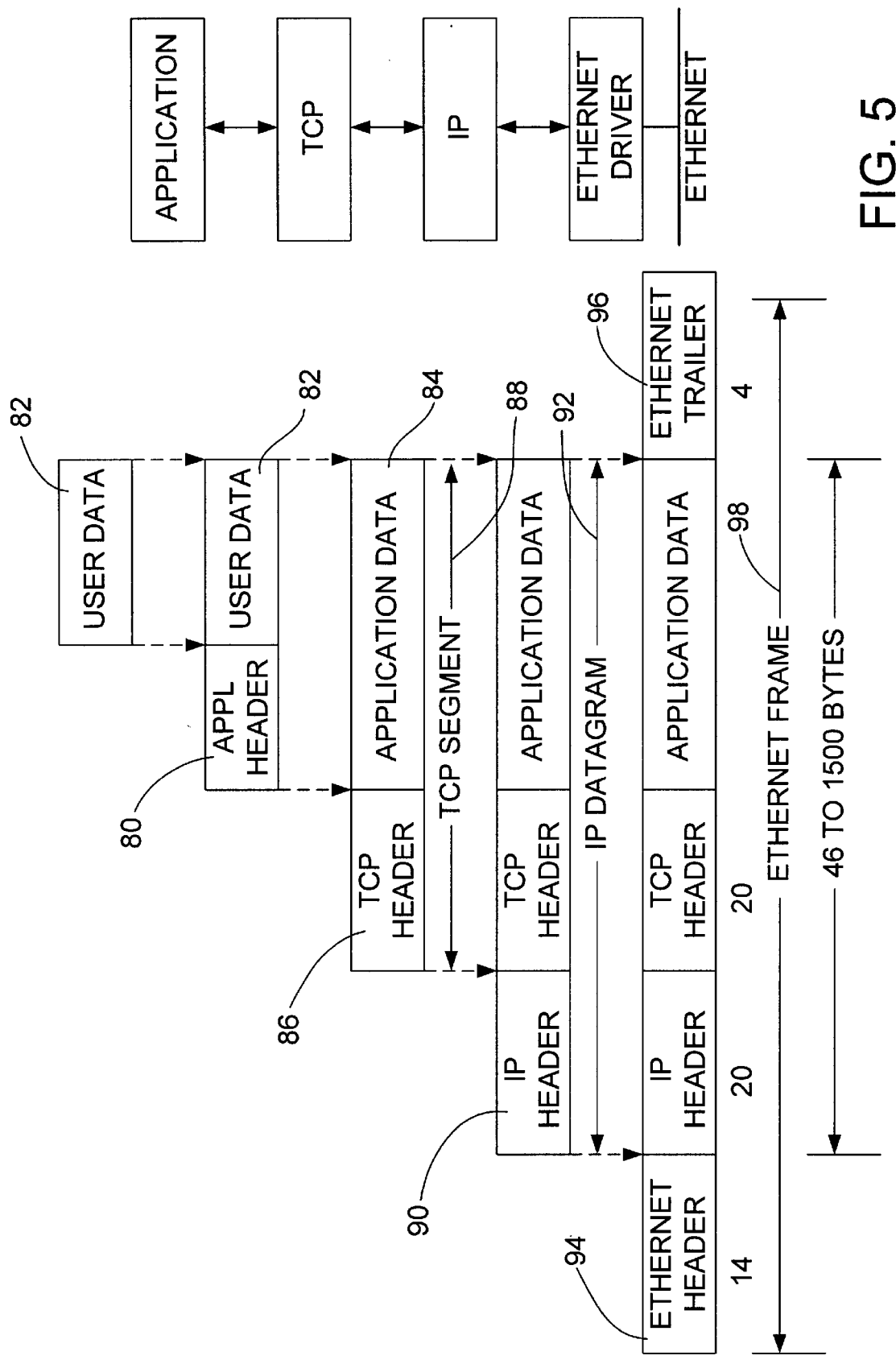
FIG. 5 shows the format of data as it traverses the TCP/IP protocol stack.

When an application sends data using TCP/IP, the data is sent down a protocol stack, through each layer, until it is sent as stream of bits across the network. As shown in FIG. 5, each layer adds information to the data by prepending headers (and sometime adding trailer information) to the data that it receives. For instance, at the application layer an application header 80 is prepended to user data 82 to form application data 84. At the transport layer a transport protocol header is prepended to the application data. In the case of FIG. 5 the transport layer is TCP, and therefore a TCP header 86 is prepended to the application data 84, thereby forming a TCP segment 88 that is sent to the network layer IP. The TCP header 86 comprises 20 bytes. Similarly, at the network layer a network layer header is prepended to the transport layer data. In the case of TCP/IP, an IP header 90 is prepended to the TCP segment 88 to form an IP datagram 92. The IP header 90 also comprises 20 bytes. Finally, at the link layer a media header such as Ethernet header 94 is added to the data received from the network layer to from a frame of data. In some instances, such as when the media is Ethernet, a media trailer is also appended to the end of the data. For instance, in FIG. 5 an Ethernet trailer 96 is appended to the Ethernet Header 94 and the IP datagram 92 to form an Ethernet frame 98. The Ethernet frame comprises the stream of bits that flow across the network that correspond to the original application message data. The numbers (14, 20, 20, 4) at the bottom of the headers are typical sizes of the headers in bytes, e.g., the Ethernet header 94 comprises 14 bytes, etc.

A substantially similar diagram could be drawn for UDP data. The only changes are that the unit of information the UDP passes to IP is called a UDP datagram, and the size of the UDP header is 8 bytes (vs. 20 bytes for the TCP header).

The size of the frame will be limited by the maximum transmission unit (MTU) of the type of network being used to transfer the data packet. For example, the MTU of an Ethernet network is 1500 bytes. The ultimate size of the data packets is only a concern at the network and link layers, and is not a concern to the application. The network layer automatically performs fragmentation (breaking the datagram up into smaller pieces) so that each fragment is smaller than the MTU of the network.

Recall from FIG. 4 that TCP, UDP, ICMP, and IGMP all send data to IP. IP must add some type of identifier to the IP header that it generates, to indicate which layer the data belongs to. IP handles this by storing an 8-bit value in its header called the protocol field. A value of 1 is for ICMP, 2 is for IGMP, 6 is for TCP, and 17 is for UDP.

Figure 6:
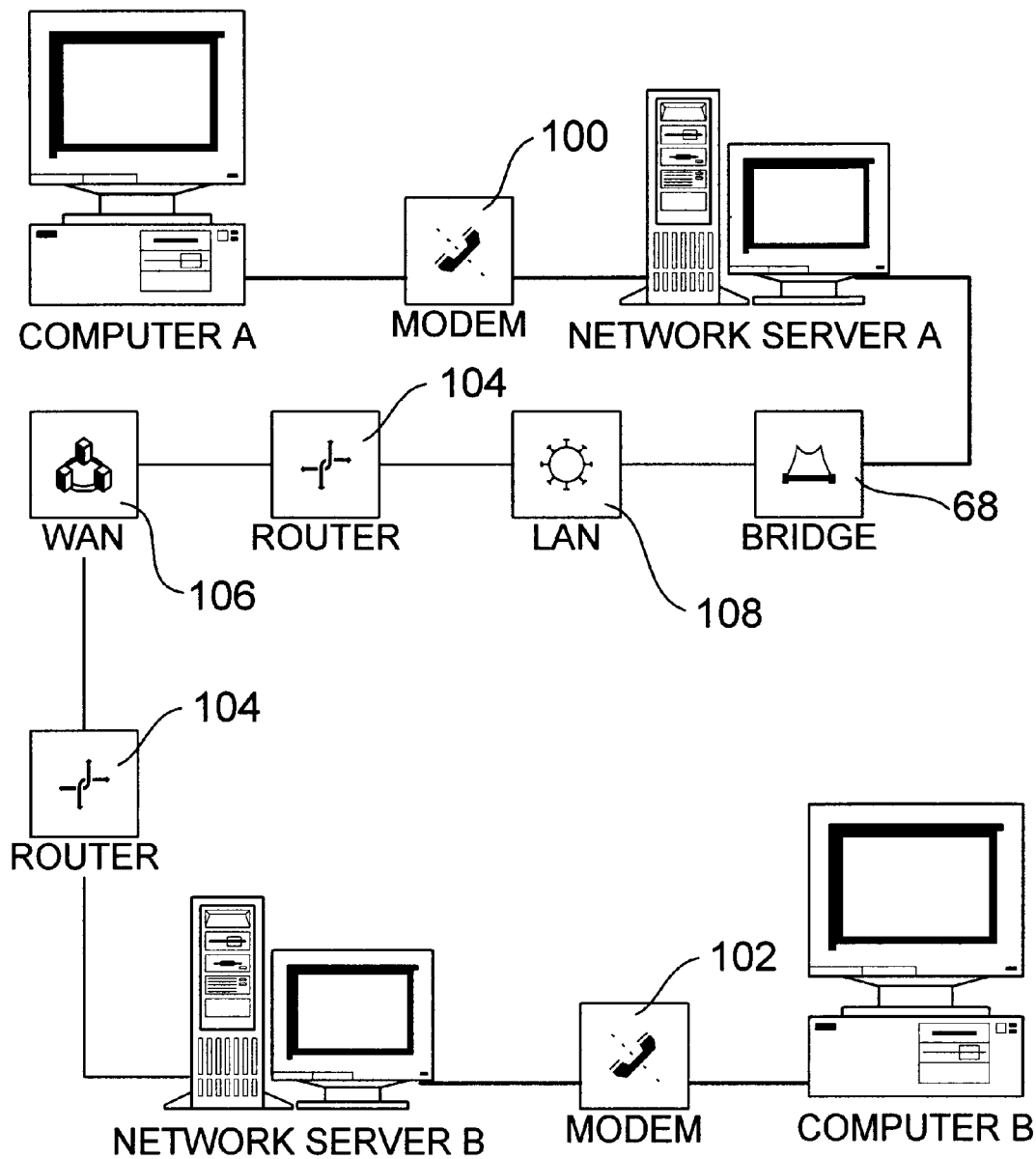
FIG. 6 shows an example of a communication path across an internet.

FIG. 6 shows a typical communication connection path that exists when two computers communicate with each other over an internet. Computer A is connected to network server A through a modem 100, such as a 28.8 kilobaud modem. In the case of communications over the Internet, the network server A may be a server provided by a local Internet Service Provider (ISP). Computer B is likewise connected to a separate network server B through a second modem 102. Modems 100, 102 may alternately be higher speed links such as ISDN lines, T1 lines, etc. Network servers A and B are connected to each other over a network comprising a plurality of routers 104 and bridges 106 that connect various networks such as WAN 106 (e.g. the Internet) and LAN 108.

Figure 7:
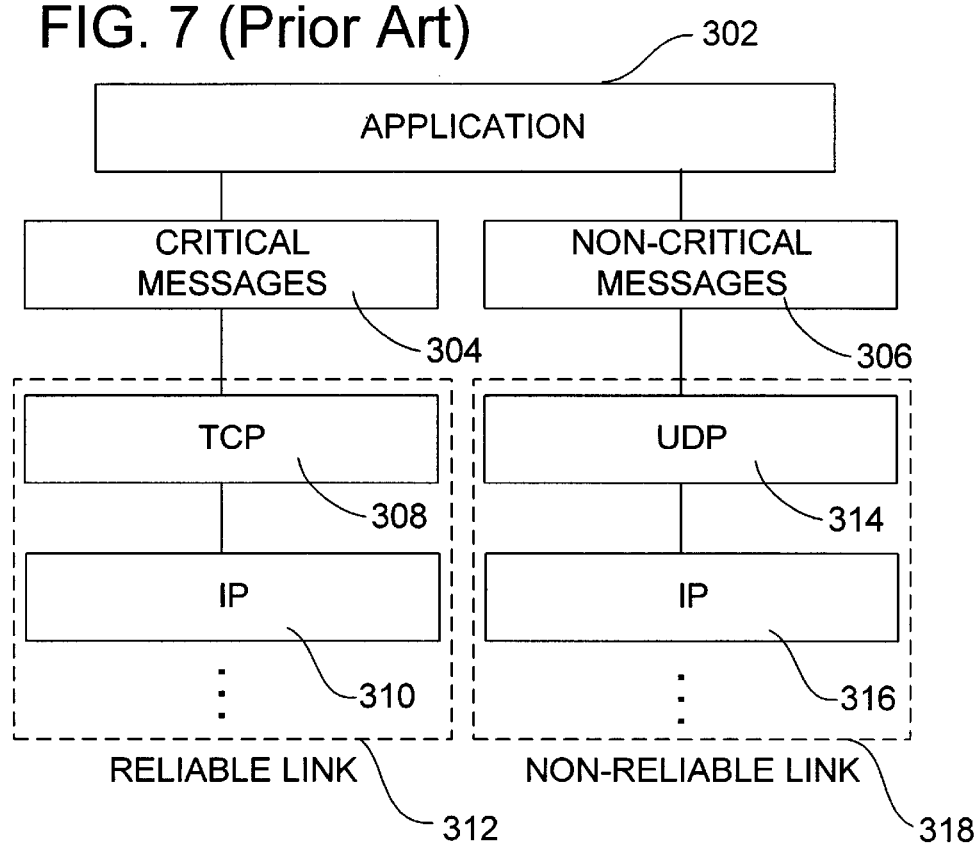
FIG. 7 shows how an application program sends messages over separate reliable and non-reliable links that implement conventional transport layer protocols.

Simultaneous Transmission of Data Over Reliable and Non-reliable Channels that Share a Single Link Recall from FIG. 7 that in the conventional method, the application programs send reliable and non-reliable messages using two separate transport services requiring two separate logical links. The invention addresses the problems associated with the conventional method (discussed above) by providing an application layer protocol that allows an application program to send both reliable and non-reliable messages over corresponding reliable and non-reliable channels that share the same communications link.

Figure 8:
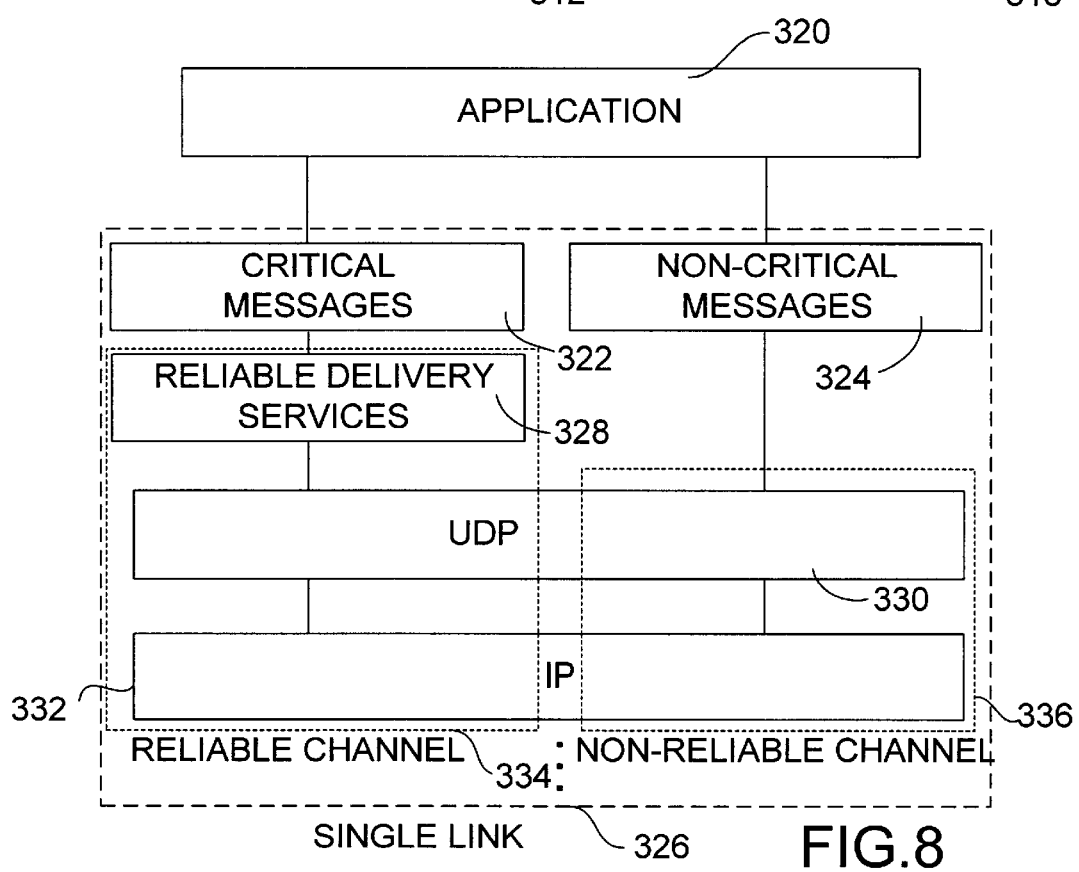
FIG. 8 shows how an application program can send reliable and non-reliable messages over a single shared-link.

The scheme for implementing this aspect of the invention is shown in FIG. 8. An application 320 sends both critical (reliable) messages 322 and non-critical (non-reliable) messages 324 over a single communications link 326. The reliability of the delivery of the critical messages 322 is provided by reliable delivery services 328. The reliable delivery of messages is facilitated by an application layer protocol that provides header information for tracking messages, to be discussed in detail below. The critical messages are sent over a UDP transport layer protocol 330, which interfaces with an IP network layer protocol 332 to facilitate a reliable channel 334. Likewise, the non-critical messages are sent over the UDP protocol 330 and IP protocol 332, which facilitate a non-reliable channel 336.

The Protocol for the DirectPlay[7] API

In order to send both reliable and non-reliable messages over the same non-reliable transport layer protocol, the implementation of the invention provides an application programming interface (API) to handle the communications that exist between the application and the transport layer. This interface also provides reliability services. This interface is provided through an application level protocol that allows an application program to send both reliable and non-reliable messages without having to be concerned with the underlying transport operations. This protocol is referred to as the DirectPlay (DP) protocol.

The DirectPlay[7] API provides send and receive functions that application programs can call to send and receive application messages via the DP protocol. An "application message" refers to the unit of data that an application program identifies for transmission when it calls the send function. The size of the application message may be bigger or smaller than the size of the messages that the DP protocol constructs to send to its counterpart DP protocol on another computer. In the context of this document, we refer to the DP protocol messages generally as "messages." In some cases, the DP messages are referred to as frames. The DP protocol may use a variety of different transport protocols, called service providers, to send its messages to a counterpart DP protocol on another computer. The manner in which a service provider transfers the data in a DP message may vary depending on the type of service provider.

In addition to simultaneous channel support, the DP protocol provides a scheme for tuning the message send rate to maximize use of the available bandwidth under varying link conditions. To achieve this end, the DP protocol determines the prevailing link bandwidth, e.g., the bandwidth between Computers A and B of FIG. 6. It determines the bandwidth between Computers A and B by saturating the link over a period of time and observing the rate at which data arrives at Computer B.

Since the only physical connection between the computers is the network itself, the observation information necessary to determine link saturation is fed back to the transmitting computer. Although this information could be transmitted as separate messages apart from the delivery protocol for messages, it is better to integrate both functions into a single protocol.

It is possible to determine when a link is saturated by assuming a small bandwidth and then increasing the send rate until link saturation is observed. In order to accomplish this determination, it is necessary to be able to measure the latency between message transmission and reception, i.e., how long it takes a message to traverse between Computer A and Computer B. A problem with using conventional protocols for this task is that conventional protocols do not provide a way for distinguishing between an original message and a retry message. This problem can be overcome by using the DP protocol which, in part, provides a message identifier (e.g., a message serial number field) in its header so that original and retry messages can be distinguished.

Figure 9:
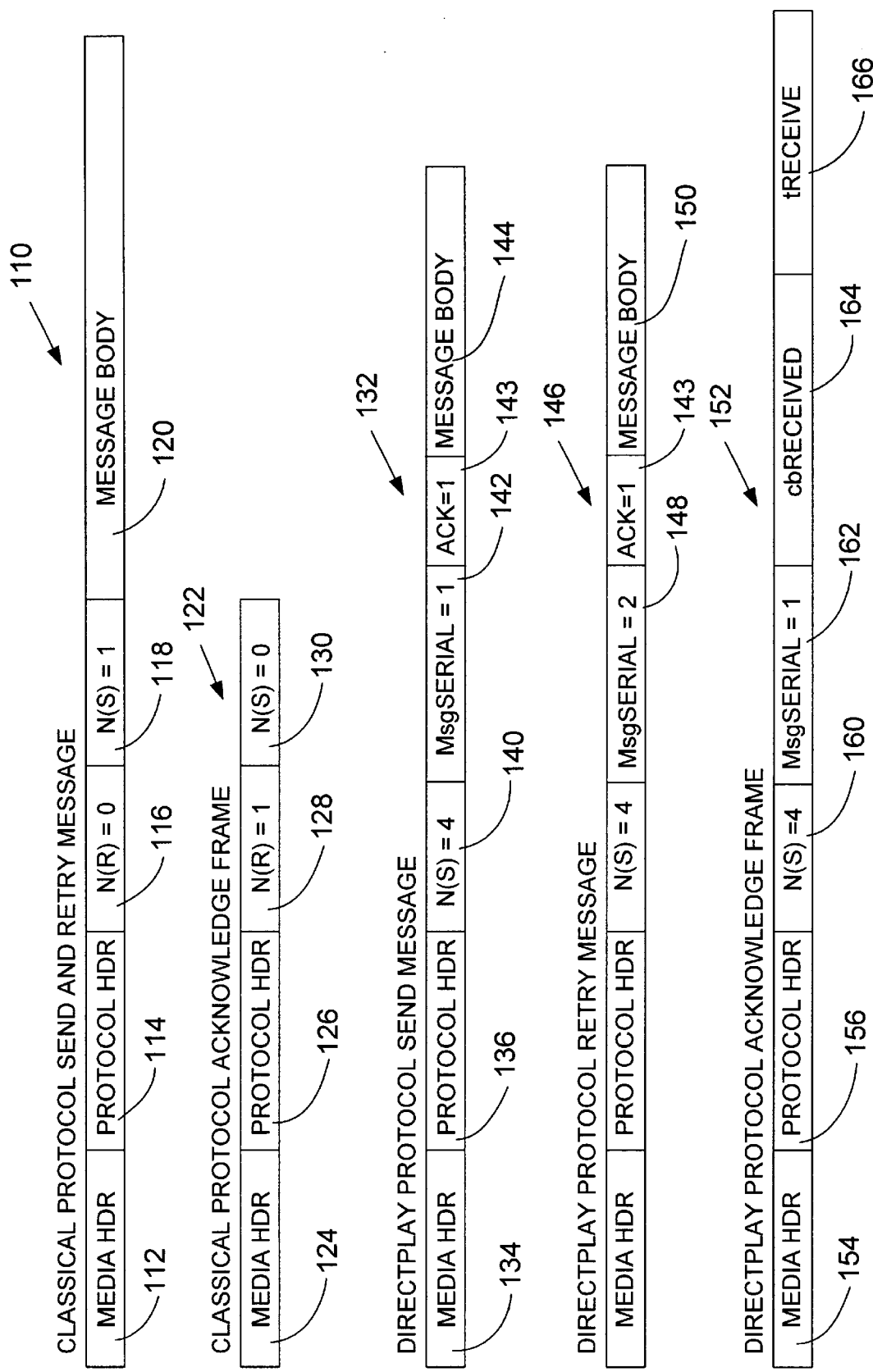
FIG. 9 shows a comparison between the headers of classical protocols and the headers of the protocol in an implementation of the invention.

FIG. 9 illustrates the difference between classical protocol headers of send, retry, and acknowledge messages and the equivalent DP protocol headers for the same message types. A classical protocol send or retry message typically comprises a media header 112, a protocol header 114, a received sequence number field 116, a send sequence number field 118, and a message body 120. The media header 112 will be particular to the type of network, e.g., an Ethernet header for an Ethernet network, etc. The protocol header will depend on the transport and network layer protocol used, such as TCP/IP, IPX/SPX, Netbios, etc. The received sequence number field 116 provides an identifier to the last sequence number reliably received by the computer. The send sequence number 118 corresponds to the relative sequential number of the message. The message body contains the application data that is being sent between the source and destination computers.

The classical protocol acknowledge frame 122 comprises a media header 124, a protocol header 126, a received sequence number field 128, and a send sequence number field 130. These fields are analogous to the fields described above which share the same name. The acknowledge frame 122 is sent by the receiving computer to acknowledge receipt of a send or retry message.

The DP protocol headers augment the classical protocol headers to provide additional information pertaining to a count of the data (e.g., number of bytes) received at the destination computer, a serial number field, and timestamp information. For instance, a DP protocol send message 132 includes a media header 134, a protocol header 136, a send sequence number field 140, a message serial number field 142, an acknowledge request field 143, and a message body 144. The media header 134, protocol header 136, send sequence number field 140, and message body 144 are similar to the like-named fields described above. The message serial number field 142 is used to provide a unique identifier for each message so that each message can be accurately tracked. In particular, the DP protocol increments the message serial number each time it re-sends a message to distinguish among the original message and re-sent messages having the same sequence number. The acknowledge request field is used to signal whether the message requests an acknowledgment from a computer that receives the message. If an acknowledge request flag is set (e.g., 1) acknowledgment is requested, while if it is cleared the message does not request acknowledgment.

While the DP protocol uses the sequence number and message serial number as a unique message identifier, there are alternative ways to implement a unique message identifier. For example, the protocol could use other distinguishing characteristics to identify a message and match it with an acknowledge message, such as pseudo-random numbers or universally unique numbers (e.g., a GUID in the Direct-Play® API).

The fields for a DP protocol retry message 146 are identical to the fields of the DP protocol send message 132. However, the value of the message serial number field 148 in the retry message header will differ from the message serial number field 142 value of the corresponding original message. For example, suppose that the message body portions 144, 150 of respective send message 132 and retry message 146 are identical—that is, message 132 is an original message and message 146 is a retry of message 132. All the header fields in both messages are identical except for the message serial number values, as is shown by comparison with message serial number field 142 with message serial number field 148.

The acknowledge frame 152 illustrates the fields in an acknowledge message in the DP protocol. The DP protocol executing in the remote computer sends acknowledge messages for outbound messages from the DP protocol in the local computer that request to be acknowledged. The acknowledge frame 152 includes a media header 154, a protocol header 156, a send sequence number field 160, a message serial number field 162, a count of bytes received (cbRECEIVED) field 164, and a timestamp (tRECEIVE) field 166. The like-named fields are similar to those described above, except that the message serial number field corresponds to the message that is being acknowledged instead of the present acknowledge message. The cbRECEIVED field 164 records the count of bytes received at the destination machine. The tRECEIVE field 166 holds a timestamp that is created at the time messages are received by the destination computer. The cbRECEIVED and tRECEIVE fields provide the basis for determining the receive rate at the destination computer. These values are also used to isolate which part of a round-trip latency can be attributed to the outbound path and the return path.

Since the DP protocol is implemented at the application layer, it can be used with a variety of different transport layer protocols, including TCP, UDP, IPX, comm links, modem-to-modem (TAPI) links, etc. However, it is preferable to use the DP protocol with transport layer protocols that do not provide built-in reliable transfer features (e.g. UDP (unreliable) vs. TCP (reliable)). This is because the DP protocol can be used to reliably send datagrams over non-reliable transport services. For instance, by tracking the unique message identifier and/or message sequence numbers, the DP protocol can determine if messages are dropped, whereupon it can resend the message so that it reliably reaches its destination. The discussion below describes the use of the DP protocol with datagram protocols such as UDP.

Adjusting the Message Send Rate

It is desired to send messages at a rate that will take advantage of the available bandwidth of the link without causing substantial dropouts, or message backlogs. The rate messages are sent (the message send rate) will depend on the detected link conditions. The term "message send rate" is actually somewhat of a misnomer, because what we are actually concerned with is the rate data is sent, i.e., the data transmission rate (number of bytes sent per second), versus the number of messages sent per unit time. However, in many games (and other) applications the message size is the same, and so the rate at which messages are sent is directly related to the data transmission rate. For instance, in a game program that has a nominal message size of 100 bytes, a message send rate of 100 messages per second corresponds to a data transmission rate of 80 kilobaud.

Generally, there are three basic send rate modes, and a throttling and backlog clear-out scheme. The criteria for the basic send rate modes is shown in Table 1 below.

TABLE 1

| Mode | No Drops | One Drop | >1 Drop |
| --- | --- | --- | --- |
| Start | +50%/message | −25%, go to Meta | −50%, go to Meta |
| Meta-stable | +4%/message | −12%, stay in Meta | −25%, stay in Meta |
| Stable | +2%/message | −12%, stay in Stable | −25%, go to Meta |

Upon initiating communication across a link, the start mode is used to rapidly ramp-up the message send rate. The start mode assumes an initial bandwidth such as 28.8 kilobaud, and increases the send rate 50% with each subsequent message that is sent until a dropped message is detected. Because we are sending over UDP (or another unreliable protocol), there is no built-in scheme for detecting dropped messages. Therefore, we compare the protocol header information for the send messages with the protocol header information for the acknowledge messages to determine if any messages have been dropped. In particular, we look at the message sequence numbers to see if any acknowledge messages skip a sequence number.

Once a dropped message is detected, the send rate is reduced by 25% (or 50% if more than one message drop is detected), and the send rate mode is switched from the start mode into a meta-stable mode. In the meta-stable mode, the message send rate is increased much more slowly (4%), until one or more message drops are detected, whereupon the message send rate is decreased by 12% (or 25% is more than one message drop is detected). At this point the send rate is increased at 4% per message again, and the process is repeated.

The message send rate will stay in the meta-stable mode until a link saturation condition is detected (detection of link saturation is discussed in detail below). Upon detection of link saturation, the outbound bandwidth of the link is calculated, along with a wait time that corresponds to the amount of time we should stop sending messages to clear out the backlog on the link. Once we have stopped sending messages for a period equal to the wait time, sending of messages are resumed at the calculated outbound bandwidth, and a new clock bias is calculated. The send rate mode is then switched to the stable mode shown in Table 1. In the stable mode the message send rate is increased 2% per message until one or more dropouts is detected. In the case of one dropout, the send rate is reduced by 12% and we stay in the stable mode. In the case of more than one dropout the send rate is reduced by 25% and we switch back to the meta-stable mode.

It should be noted that link saturation conditions are constantly being evaluated, and that such a condition will trump control of the data send rate mode. For instance, a link saturation condition will cause the message send rate to be changed to a recalculated outbound bandwidth regardless of what the previous send rate mode was.

Maintaining a Clock Offset Between Two Computers

The DP protocol calculates link bandwidth when the link is saturated. In order to determine if the link is saturated, it relies on detecting increases in outbound latency. Since the DP protocol can only observe round trip latency, it needs a method of isolating the outbound and return components of the round trip latency. This can be accomplished if the offset of the system clocks of the computer are known and if the acknowledge message contains a timestamp from the remote system clock of the destination computer.

When the DP protocol on Computer A sends out its first message, it is fairly safe to assume that there are no other messages between Computer A and Computer B to slow down the round trip of the first message and it's acknowledgement. Although this is a fairly safe assumption, it is not relied upon completely, but rather the assumption is used to make an initial guess at the offset between system clocks on the two machines. When any message that requires an acknowledge is sent by the DP protocol, the protocol first records the system time on Computer A and then sends the message. When Computer B receives the message, it sends an acknowledge message that includes information corresponding to the system clock reading of Computer B at the time Computer B receives the message. When Computer A receives the acknowledge message, it calculates a clock bias between the two machines as follows:

$$\text{Bias}=t\text{Receive}_0-t\text{Sent}_0 \quad (2)$$

Where Bias, tReceive and tSent are all unsigned values of the same size, e.g. unsigned 16 or 32-bit values. tSent is the value of the system clock on the sending computer when the message was sent, while tReceive is the value of the system clock on receiving computer when the message was received.

Subsequently, when new messages are acknowledged by the receiver, the sender can determine if the Bias is growing or shrinking by the calculation:

$$\Delta\text{Bias}=\text{Bias}-(t\text{Receive}_n-t\text{Sent}_n) \quad (3)$$

Although this scheme is sound on its face for detecting increases and decreases in latency, it has a built-in difficulty that must be accounted for. Simply put, the system clocks on PC-class hardware are not very accurate. In fact, it is common for the clock drift between two computers to be as high as 0.1% or about 1 ms/sec. Given the necessity of accurate values in the algorithms the DP protocol uses, this rate of clock drift is generally unacceptable.

The clock drift problem can be overcome by employing a scheme that takes into account the following considerations: (1) the throttling algorithm used to "throttle" (reduce the message send rate on) the link when link saturation is detected is based on growth of the latency period between the two computers; (2) the DP protocol tries to push up link utilization by assuming more bandwidth becomes available over time; (3) there is an opportunity to re-establish the Bias value whenever the throttling algorithm throttles the link; and (4) shrinking latency can be used to re-establish the Bias value.

We now proceed with discussing the appropriate action to take under the various clock drift scenarios. There are three possibilities when considering the relative clock rates between the two computers, including:

1. The transmitter's clock runs slower than the receiver's clock
2. Both clocks run at the same speed.
3. The transmitter's clock runs faster than the receiver's clock.

In case 1, under a steady-state network condition the apparent latency of sent messages will appear to grow, even though the link is not saturated. This will eventually lead to the erroneous assumption that the link is saturated and cause the DP protocol to throttle the link. Any time the link is throttled, it is assumed that the backlog on the send path (packets backed up at some point in the send path) has been cleared and the subsequent send will not incur any latency due to a backlog. At this time the Bias value is recalculated. This means that sometimes we will unnecessarily throttle the link from time to time. However, since the throttle time will not exceed the total clock drift between the computers, the error due to this affect will at worst compromise 0.1% of the available bandwidth.

In case 2 there is no drift, and so our previous calculation (3) will provide accurate results of the apparent latency under varying network conditions.

In case 3, under a steady-state network condition the bias value will appear to shrink. Since any bias value smaller than the current value implies a shorter round trip, it can be taken as a "better" sample and the bias can be immediately recalculated.

The following example illustrates a typical set of Bias and ΔBias calculations. Suppose that there is a pair of computers A and B that are communicating over a network, where the clocks on computers A and B are not synchronized. After the communication link is established, computer A sends out a first message at computer A time 0 milliseconds (ms). Since the computers' clocks are not synchronized, there is no way to measure the time between when this first message is sent by A and when it is received by B. The next best thing is to record the time that B receives messages according to B's own clock. Suppose that when B receives the first message its clock reads 500 ms. B then sends an acknowledge message to A indicating that B received the first message at a B time clock reading of 500 ms. In this instance, the initial bias calculation leads to 500−0=500 ms.

The DP protocol uses this bias measurement to determine whether the latency is increasing or decreasing by use of equation (3). For instance, lets say that A sends a second message at local A time 10 ms, and B receives this second message at local B time 510 ms. The change in bias (ΔBias) calculation yields 510−10−500=0. This indicates that there is no change in latency between the first message and the second message. This could be due to constant network conditions, or a change in network conditions with a corresponding difference in clock rates between the computers that exactly matches the change in the network condition. We can never be certain because of the inconsistency between computer clock rates.

At the start of a third message, the local time on computer A is now 100 ms. This third message is received by B at a local (B) time of 608 ms. The ΔBias calculation now yields 608−100−500=−2 ms. This negative value implies that either the latency has decreased, or that clock A is running faster than clock B.

Rather than use just the initial bias measurement, the bias value may be continually updated. In the current implementation, the DP protocol calculates the bias for a first message and then maintains this value as the clock bias until: 1) the send rate is reduced (e.g., in response to detecting link saturation); or 2) the bias is observed to decrease, in which case, the new, reduced bias value replaces the stored bias. In the first case, the DP protocol recalculates the bias just after reducing the message send rate in response to detecting link saturation. It calculates the bias from the send and receive times of one of the first new messages sent after adjusting the send rate and waiting for backlogged messages to clear. In the second case, the DP protocol replaces the existing bias with the new, reduced bias by computing the bias for the current message, comparing it with the stored bias, and replacing the stored bias with the current bias when the current bias is a smaller value. An alternative way to update the bias as messages are sent is to use a sliding average taken from N measurements. For example, the most recent five or ten bias measurements may be averaged to determine the stored bias value. By using these schemes, the bias value may more closely represent the actual difference between the two system clocks.

Detecting Link Saturation

During the life of a network link, the capacity of the link to handle data will vary over time. The reasons for the variations are many and can include saturation of part of the network path; saturation of the transmitting computer's connection to the network; or saturation of the receiver's connection to the network. As these "bottlenecks" in the network path shift, so does the available capacity of the end to end network link. The capacity of the entire link at a given time is limited to the capacity of the current bottleneck. There are two effects the bottlenecks may have on the data stream when they are overloaded; the bottleneck may cause data to be dropped or the local network at the bottleneck may buffer data and introduce increased latency. The proper behavior for dealing with drops due to link overload are well understood and dealt with in many protocols.

The DP protocol includes functionality to handle bottleneck situations that improve upon similar features provided by classical protocols. Just as with other protocols, the DP protocol provides a throttling feature that reduces the message send rate when excessive drops are detected. In addition, the DP protocol can set a lower bound on the throttling mechanism of classical protocols than would normally exist. The DP protocol never allows congestion control to drop the send rate below the current receive rate at the receiver. The DP protocol also provides a throttling mechanism for clearing out backlogged messages.

The first step in establishing available link bandwidth is to detect when the link is saturated. The criteria that the DP protocol uses to determine when the link is saturated is when the round trip latency of the link grows to a point where there is a high level of confidence that the increased latency is due to a backlog on the link. In order for there to be a backlog on the link, the sending rate must exceed the capacity of the link's bottleneck and cause buffering of messages as they wait to be transmitted. This situation is typically encountered when the message transmission rate exceeds the network bandwidth (capacity) at the bottleneck.

The link saturation determination involves a two-criteria process. The first criterion involves a statistical calculation that measure the increase in the round-trip latency relative to an average round-trip latency. One way to perform this statistical calculation is to use the standard deviation value. The standard deviation σ is the square root of the variance of a set of measurements, and is determined as follows:

$$\sigma^2 = \frac{\sum (x-\mu)^2}{N} \tag{4}$$

where $\mu$ is the mean (average) of the set of measurements, x is an individual measurement, and N is the total numbers of measurements in the set. Once the standard deviation is determined a boundary can be set for making the link saturation determination. The DP protocol uses a boundary of plus three standard deviations or 3σ. For instance, if the round-trip latency measurement exceeds the average round-trip latency +3σ, then this first criterion is met.

Once the first criterion is met, the DP protocol determines if the backlog is due to an increase in outbound latency. We do not want to apply a throttle in situations where the round-trip latency increase is solely due to increased latency on the return path. A determination of whether the increase is due to outbound latency can be performed by computing the difference in clocks for the latest send message and comparing it to the stored Bias value. If the difference between the bias for the latest send and the stored bias accounts for a large part (e.g., ½ or greater) of the round-trip latency, then we assume the link is backlogged.

Determining Outbound Bandwidth

Once the two foregoing criteria are met, the DP protocol assumes that the link is in a backlogged state that has caused the outbound latency to increase. Two corrective actions are then taken to eliminate the backlog and adjust the sending rate so as to not reintroduce a back-logged condition on the link. First, the DP protocol calculates the receive rate at the receiver, which should be the outbound bandwidth of the link. Next, it determines how long it must wait to clear the backlog. The current implementation assumes that a reasonable approximation of the link backlog is the current number of outstanding bytes (bytes that have not been acknowledged) minus the average latency multiplied by the link bandwidth. Then the time to wait is the backlog divided by the bandwidth. Once the DP protocol has suspended sending new messages for that long, it can be fairly certain the backlog has cleared.

The following example is used to illustrate the calculations. The example assumes that several messages totaling 95000 bytes have already been transmitted between a local (sending) computer and a remote (receiving) computer. The message send rate has been progressively increased causing a link saturation condition to be detected in concurrence with sending of the last message. At this point an $i^{th}$ message (packet Z) is sent. The size of packet Z will generally be about 100 bytes or less.

Assume the following link conditions, determined by observing the messages prior to packet Z:

average latency, tAvgLat is 70 ms average deviation in latency, tAvgDevLat is 10 ms remote clock bias is 25,286,762

For packet Z, the following information is recorded when it is sent out:

SendTime=25,997,030 (local clock when sent)

LocalSent=100000 (bytes sent on link including packet Z)

RemoteReceived=95000 (bytes received on remote and reported back in last ACK)

RemoteReceiveTime=51,283,742 (remote clock time when bytes were received)

The local computer receives the Acknowledge for Z at local time t=25,997,150. It contains the following information:

RemoteReceivedBytes =100000 (bytes received at remote when Z arrived)

RemoteReceiveTime=51,283,855 (remotes system clock when Z arrived)

The round trip latency for Z is equal to:

the time the Acknowledge for Z was received−the time Z was sent (5)

25,997,150−25,997,030=120 ms

The change in bias of the Acknowledge message for Z from the stored bias value is:

$\Delta Bias = Bias - (tReceive_n - tSent_n)$ (3)

RemoteReceiveTime−LocalSendTime−Bias 51,283,855−25,997,030−25,286,762=63 ms

This calculation indicates that the latency due to link backlog is around 63 ms. However, this data is slightly out-of-date—the backlog was about 63 ms when Z was sent. If the present (real-time) latency due to link backlog actually was 63 ms then we would merely stall issuance of any new outbound messages on the link for 63 ms to allow the backlogged messages in the link to be cleared out. Unfortunately, since the data is not real-time, pausing the link for 63 milliseconds will not suffice. Instead, we determine the appropriate wait time based on a calculation that uses the calculated receive rate (at the remote computer) and a new backlog determination.

In addition to the above conditions, let's assume that we continually sent an additional 10,000 bytes of data since sending Z, so the current total sent value is 110,000 bytes. From this information we can infer that the current SendRate over the 120 ms it took to acknowledge Z is 10,000 bytes/120 ms=83333 bytes/sec.

We can now calculate the receive bandwidth bw over the period as the number of bytes received on the remote between when Z was sent and its Acknowledge received as follows:

$$bw = \frac{\text{Number of Bytes Received at Remote}}{\text{Change in Remote Receive Time}}$$ (6)

$$bw = \frac{100000 - 95000}{51,283,855 - 51283,742} = 41,666 \text{ bytes/sec}$$

Now we can determine the size of the pipe between the sender and the receiver. If we had been sending at the correct rate (41,666 bytes/sec) and the outbound and return latencies were about the same (say 35 ms) then we would expect 0.035sec*41,666bytes/sec=1458bytes to fit in the pipe. That is, the physical link (pipe) between the machines holds 1458 bytes.

According to the example, we have sent 10,000 unacknowledged bytes. But it is reasonable to assume that 1458 bytes may have been received and still not acknowledged because of the return time for the Acknowledge to propagate across the network. Additionally, 1458 bytes may have been sent but not yet received at the remote computer. Therefore, the actual backlog is about 10,000−2*(1458) bytes or 7084 bytes. As a result, we should adjust our sending rate to 41,666 bytes/sec and wait for 7084/41666=170 ms before sending again. In addition, after this wait, the bias value can be recalculated with the presumption that there will not be an error introduced by backlogged messages on the link.

The above description of how the DP protocol functions is generally the case during most data transmissions. However, there are some conditions under which the foregoing calculations may lead to undesirable tuning parameters. Therefore, the DP protocol also provides a number of conventional methods to handle these situations. For example, if the send rate exceeds 50,000 bytes/sec, the standard DP protocol calculations are not used.

Simultaneous Tuning of Reliable and Non-Reliable Channels on a Single Link

As discussed above, there are many situations where it is desired to be able to send both reliable and non-reliable messages over a single shared link. However, conventional transport layer protocols are designed to provide either reliable services (e.g., TCP) or non-reliable services (UDP). Since TCP and UDP are independent protocols designed to operate individually, they do not share tuning information for the link. Similarly, the code that implements these protocols is typically independent and does not communicate within a system to collaborate on the tuning of communication between the system on which they reside and some other remote computer.

The DP protocol overcomes these problems by implementing both reliable and non-reliable delivery over a shared communications link. The tuning parameters are maintained for the link as a whole rather than separately for reliable and non-reliable messaging.

The DP protocol sets the acknowledge request flag (in field 143 in FIG. 9) for outbound messages, including selected reliable messages and non-reliable messages. It sets the acknowledge request flag for selected reliable messages for the dual purpose of implementing reliable delivery and maintaining operational characteristics used to tune the link. In the case of non-reliable messages, the DP protocol uses the acknowledge flag to request an acknowledgement in situations where it is gathering operational characteristics of the link.

The term "selected messages" is used to reflect that each message does not require a request for acknowledgement (an "ACK") to facilitate reliable message transfers or link tuning. In the case of reliable message transfers, the protocol may but does not have to request an ACK for each message. The DP protocol implementation, for example, uses a negative acknowledgement approach in which it requests one ACK per window of some pre-determined number of messages. The ACK for a window of messages conveys which message or messages need to be re-sent in the window. In the case of link tuning, the protocol also does not need to request an ACK for each message, and preferably does not do so. The DP protocol implementation, for example, selectively requests ACKs for non-reliable messages based on a pre-determined fraction of a latency period (e.g., one ACK request per one-half or one-fourth of the average latency period). It is useful to set a limit on the frequency of ACKs for tuning purposes (e.g., 50 ms between requests) since more frequent requests are not necessary or helpful in obtaining meaningful operational data.

The frequency with which the protocol requests ACKs for reliability vs. for link tuning may be roughly the same or differ. There may be connections where requests for ACKs for link tuning are less frequent than for reliability or vice versa. For a reliable connection, the protocol may request ACKs less frequently for reliability and for updating the link characteristics. For unreliable connections, the protocol may request ACKs more frequently to ensure reliable transfer and to update the link characteristics. The current DP protocol implementation selectively enables the ACK flag (143 in FIG. 9) depending on whether it is sending reliable or non-reliable messages. When sending reliable messages, the protocol does not request additional ACKs for tuning purposes, but instead relies on the ACKs requested for reliability purposes to gather operational characteristics. When the link is sending non-reliable messages, the DP protocol requests an ACK based on the link characteristics as noted above. In particular, it requests an ACK for a period of time defined as a pre-determined fraction of the latency of the link. Other methods for setting the frequency of ACK requests are possible, such as one per some fixed window of messages, one per some fixed amount of data, one per some pre-determined time period, etc.

When the DP protocol of the remote computer receives a message with a set acknowledge request flag, it sends an acknowledge message in response. The DP protocol sends an acknowledge for each message requesting one. In the case where it receives a message out of sequence, it sends an acknowledge with a list indicating which message(s) were not received (e.g., a negative acknowledge list or NACK list). It sends an acknowledge in the case where all messages in a window have been received. On the sending computer, the DP protocol re-transmits messages that have been specifically enumerated in the NACK list.

The DP protocol allows acknowledge messages to be sent in a delayed fashion, rather than immediately upon receipt of a message requesting an acknowledge. In this case, the DP protocol in the acknowledging computer adds a field to the acknowledge message indicating how long it was delayed in the acknowledging computer. This allows the acknowledging computer to "piggyback" the acknowledge information on a returning data frame if the link is being used bi-directionally. The delay time field allows the statistics for the outbound and return path to be isolated properly.

A primary advantage of this scheme is that both reliable and non-reliable message channels can share the same link. In addition, the acknowledge feedback information for the outbound messages can be used to tune the link for both reliable and non-reliable channels simultaneously.

API implementation of the DP Protocol

In order to implement the DP protocol, it is necessary to provide a mechanism that fits into the overall network protocol layering scheme. This is accomplished by providing the DP protocol functionality through a set of DirectPlay[7] API (Application Program Interface) calls.

Figure 10:
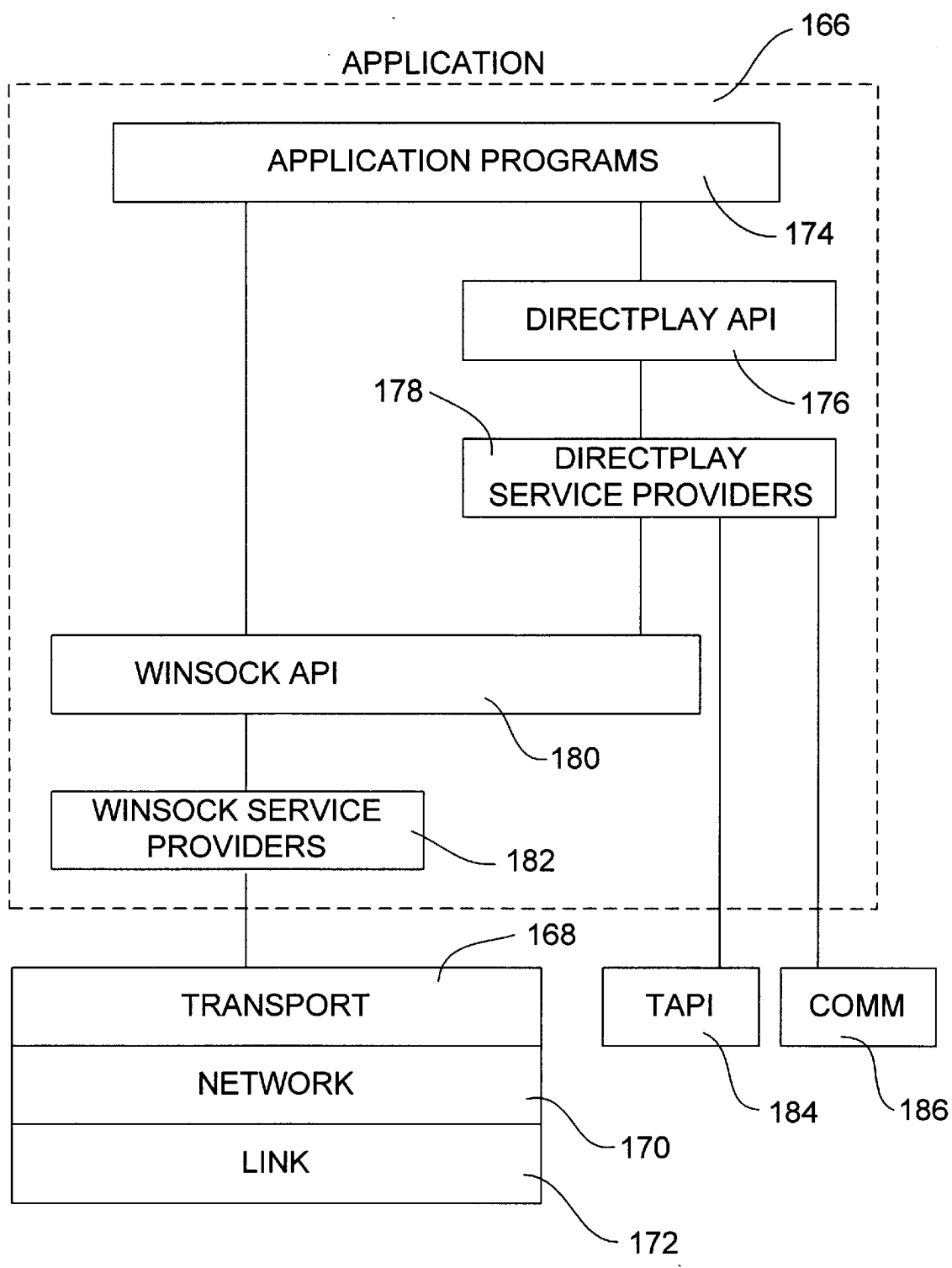
FIG. 10 is a block diagram illustrating the relationship between an application programming interface that implements the network protocol of the invention and other software components.

FIG. 10 shows how the DirectPlay[7] API fits into the network protocol layering scheme. The primary layers are still (see FIG. 1) the application layer 166, the transport layer 168, the network layer 170, and the link layer 172. The functionality of the DP protocol is contained within the Application layer 166, which includes application programs 174, DirectPlay[7] API 176, DirectPlay[7] API Service Providers 178, Winsock API 180, and Winsock Service Providers 182.

An application program that communicates with other computers over a network needs a way to be able to open and close communication links, send and retrieve data, etc. In programs that are designed for the Windows® operating system, this functionality is typically provided through a set of services contained within the Winsock API 180. Winsock stands for Windows Sockets, which is an industry standard interface specification that defines how applications communicate with TCP/IP and other network protocols. This specification includes definitions for how to use the transport protocols and how to transfer data between two computers, including the establishment of connection-oriented sessions (TCP three-way handshake) and non-connection-oriented datagrams.

As shown in FIG. 10, the Winsock API 180 uses a set of Winsock service providers 182 to connect to various networks that use different protocol suites. A service provider is a dynamic-link library (DLL) that provides the necessary code to interface between the API call and the type of network protocol suite being used for the transport and network layers. For instance, there are separate DLL service providers for TCP/IP and IPX/SPX.

While it is common for programs to directly utilize the Winsock API, it is preferable for game programs and other network communication intensive programs to indirectly access the Winsock API through the use of the DirectPlay[7]

API 176. The DirectPlay[7] API is a set of API calls that allow game applications to communicate over any network with relative ease, provided there is a DirectPlay service provider for that network type. As with the Winsock API, the DirectPlay[7] API 176 uses service providers that allow it to communicate over various network links, including modem-to-modem connections (TAPI) 184 and serial connections (COMM) 186. Rather than duplicate the built-in network services of the Winsock API 180, one of the service providers 178 provides an interface between the DirectPlay[7] API 176 and the Winsock API 180 to allow the DirectPlay[7] API to use various Winsock API functions.

Figure 11:
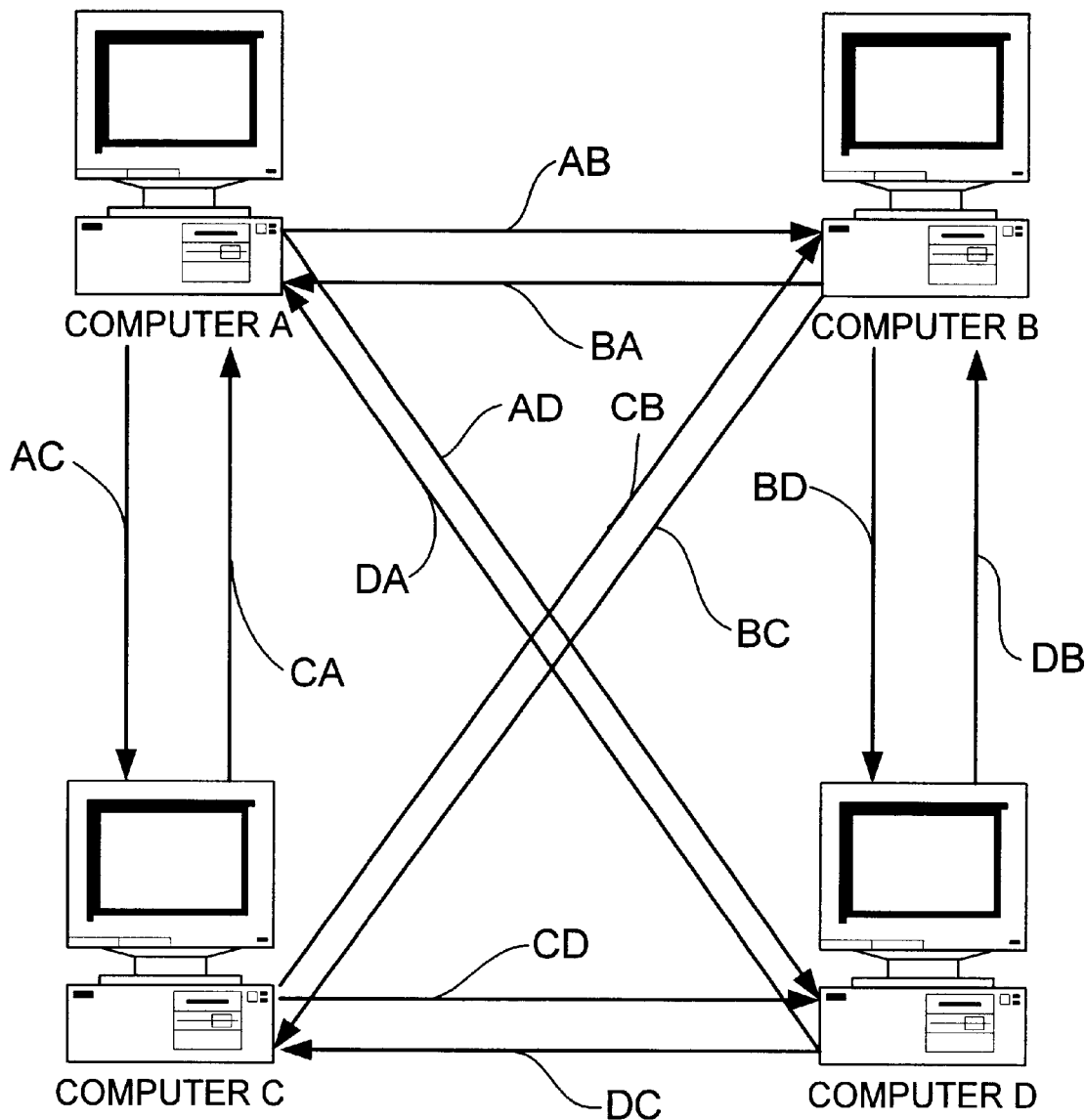
FIG. 11 shows the various communication links that are used when four players are playing in a peer-to-peer game over a network.

Through the use of the API, network applications running on computers linked via network can each take advantage of the features of the DP protocol. For instance, four players may be simultaneously playing the same game over a network, whereby the players are in a peer-to-peer relationship to one another. Therefore, a pair of outbound message links (and associated bandwidths and potentially backlogs) exist between each peer-to-peer relationship. As shown in FIG. 11, in such a relationship there are 12 outbound links between the computers. The outbound links for computer A include links AB, AC, and AD; for computer B the outbound links include BA, BC, and BD; for computer C the outbound links include CA, CB, and CD, and for computer D the outbound links include DA, DB, and DC. Each link represents a communication path between a pair of computers, whereby the messages between the computers may traverse various networks, routers, bridges, etc.

The advantages of the invention can be employed for each of the outbound links, or alternately can be employed for selected outbound links. By using the methods described above, the bandwidth, saturation, and backlog (if applicable) for each link can be established, and the send rates for communicating messages between players can be continually tuned to compensate for the present network conditions on an ongoing basis.

Overview of DP Protocol Operation

FIGS. 12–15 are flow diagrams providing an overview of the operation of the DP Protocol. As noted above, the DP Protocol maintains a clock offset between the local and remote computers in a network communication link. This clock offset, referred to as the bias, may then be used to detect link saturation more accurately. The DP Protocol is able to optimize data transfer over the link by tuning send rates so that the send rates are at or near the point of link saturation. When it detects link saturation, the DP Protocol computes the outbound bandwidth, and uses the result to determine how long to stall sending messages to clear a message backlog on the link.

Figure 12:
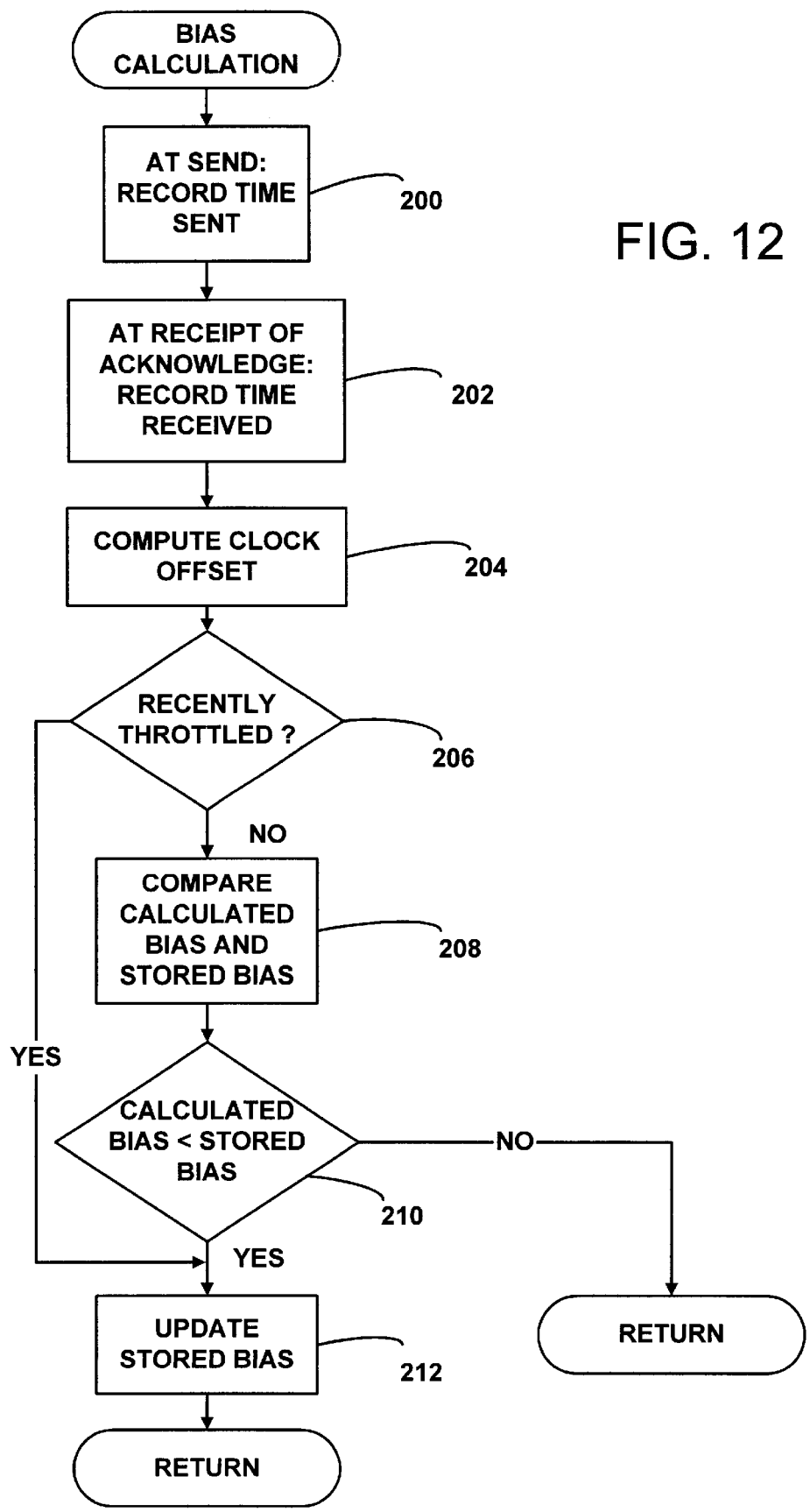
FIG. 12 is a flow diagram illustrating a method for maintaining a clock offset between two computers connected via a network communication link.

As shown in FIG. 12, the DP Protocol obtains the data it needs to compute a clock offset by recording the time it sends a message (200) and the time the remote computer receives that message (202). The DP Protocol computes the clock offset as the difference between the send and receive times (204).

The DP Protocol initializes the clock bias when it first starts sending messages and when it sends a new message after throttling the network communication link. For example, as shown in FIG. 12, if the DP Protocol has just reduced the send rate after detecting link saturation (206), it proceeds to update the bias based on the first message it sends after waiting for the stall time to elapse.

The other instance for updating the stored bias value is when the DP Protocol observes that the clock bias has decreased. Each time the DP Protocol sends a new message, it computes the clock offset as shown and then compares it to the stored bias value (208). When the calculated bias value is less than the stored bias value (210), the DP Protocol replaces the stored bias value with the newly calculated bias (212). Otherwise, it maintains the current, stored bias value.

Figure 13:
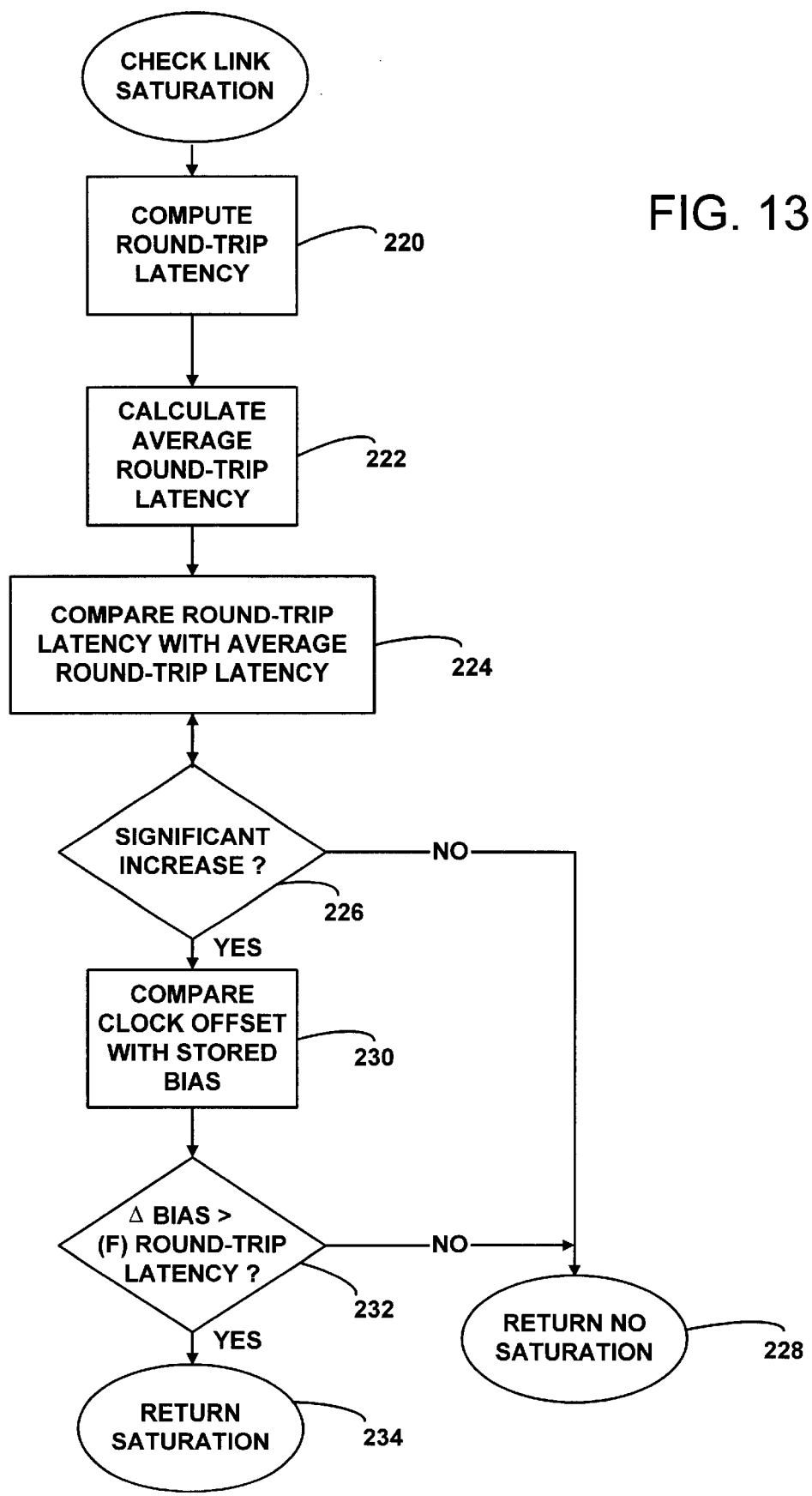
FIG. 13 is a flow diagram illustrating a method for detecting saturation of a network communication link.

As shown in FIG. 13, the DP Protocol detects link saturation in part by monitoring the round-trip latency of the messages that it sends. With each message, the DP Protocol computes the round-trip latency (220). It then updates its average round-trip latency (222) as explained above. To check for link saturation, it compares the newly computed round-trip latency with the average round-trip latency to determine whether a statistically significant increase in the round-trip latency has occurred (224). When it does not observe a significant increase based on pre-determined criteria (more than a threshold increase, such as 3 standard deviations over the average), it assumes that the link is not saturated. However, if it deems the increase to be significant, it then compares the clock offset for the current message with the stored bias (230). When the change in bias is greater than a pre-determined fraction of the round-trip latency, the DP Protocol assumes that the increase is due to outbound latency and that the outbound path is saturated (232, 234). Otherwise, it assumes that the outbound link is not saturated (228).

Figure 14:
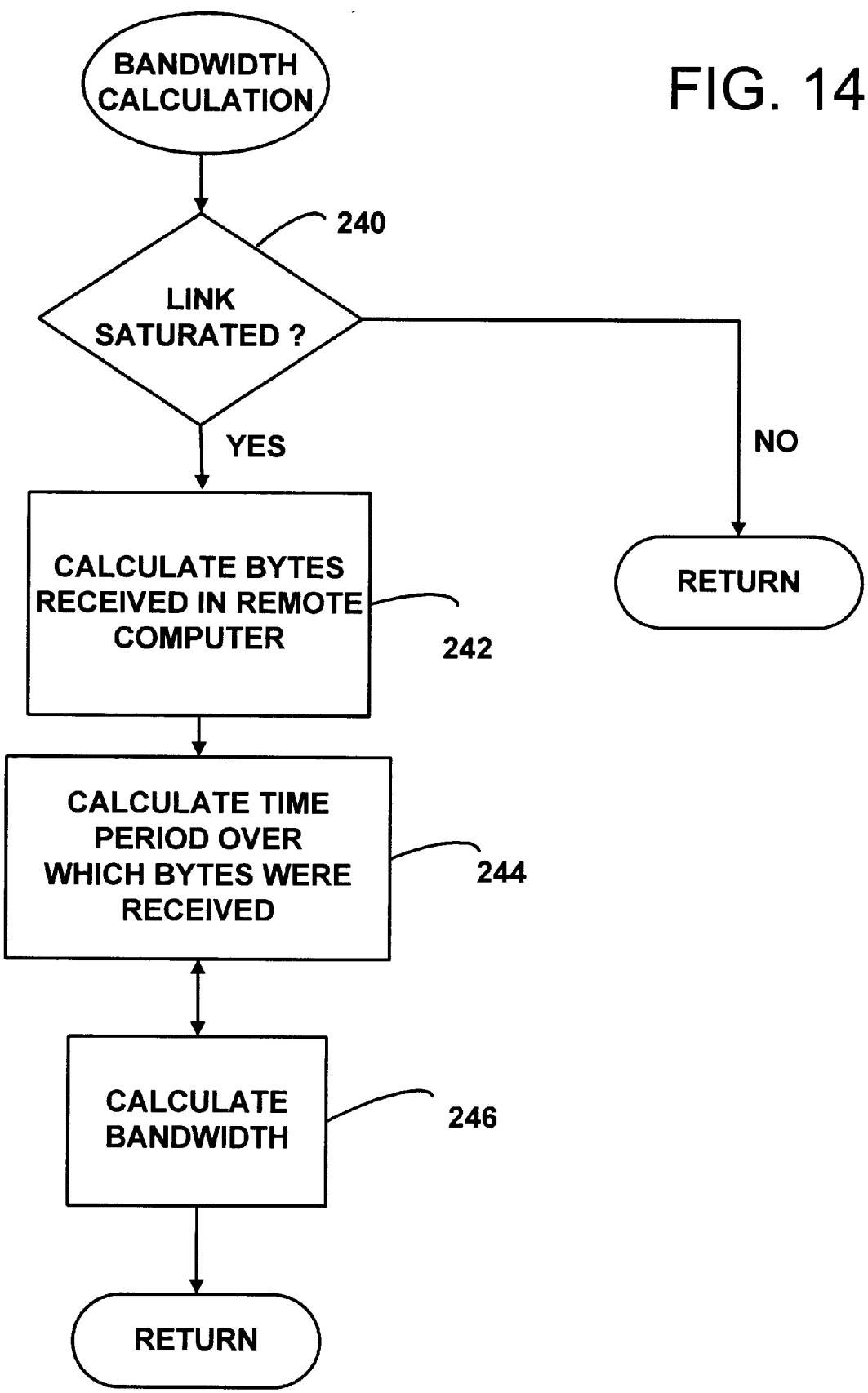
FIG. 14 is a flow diagram illustrating a method for calculating outbound bandwidth on a network communication link.

When the DP Protocol detects link saturation, it can assume that it is operating approximately at the maximum available outbound bandwidth on the network communication link. At link saturation, the DP Protocol has an opportunity to measure the outbound bandwidth. FIG. 14 illustrates a flow diagram showing how the DP Protocol computes the outbound bandwidth at this point. When it detects link saturation (240), it determines the total bytes received in the remote computer over a known time period (242). It is able to calculate the bytes received because it has recorded the amount of data received in the remote computer and the time that the data was received from the last acknowledge message. It sends a new message, recording the local send time, and amount of data sent on the link, including the new message. When the acknowledge message returns for this new message, it includes the remote receive time, and the amount of data received in the remote computer when the new message arrived. Using the receive times and data received information from these two acknowledge messages, the DP Protocol calculates the amount of data received in the remote computer during the time between these two messages (244). It then computes the bandwidth by dividing the data received in the remote computer by the time over which that data was received (246).

Figure 15:
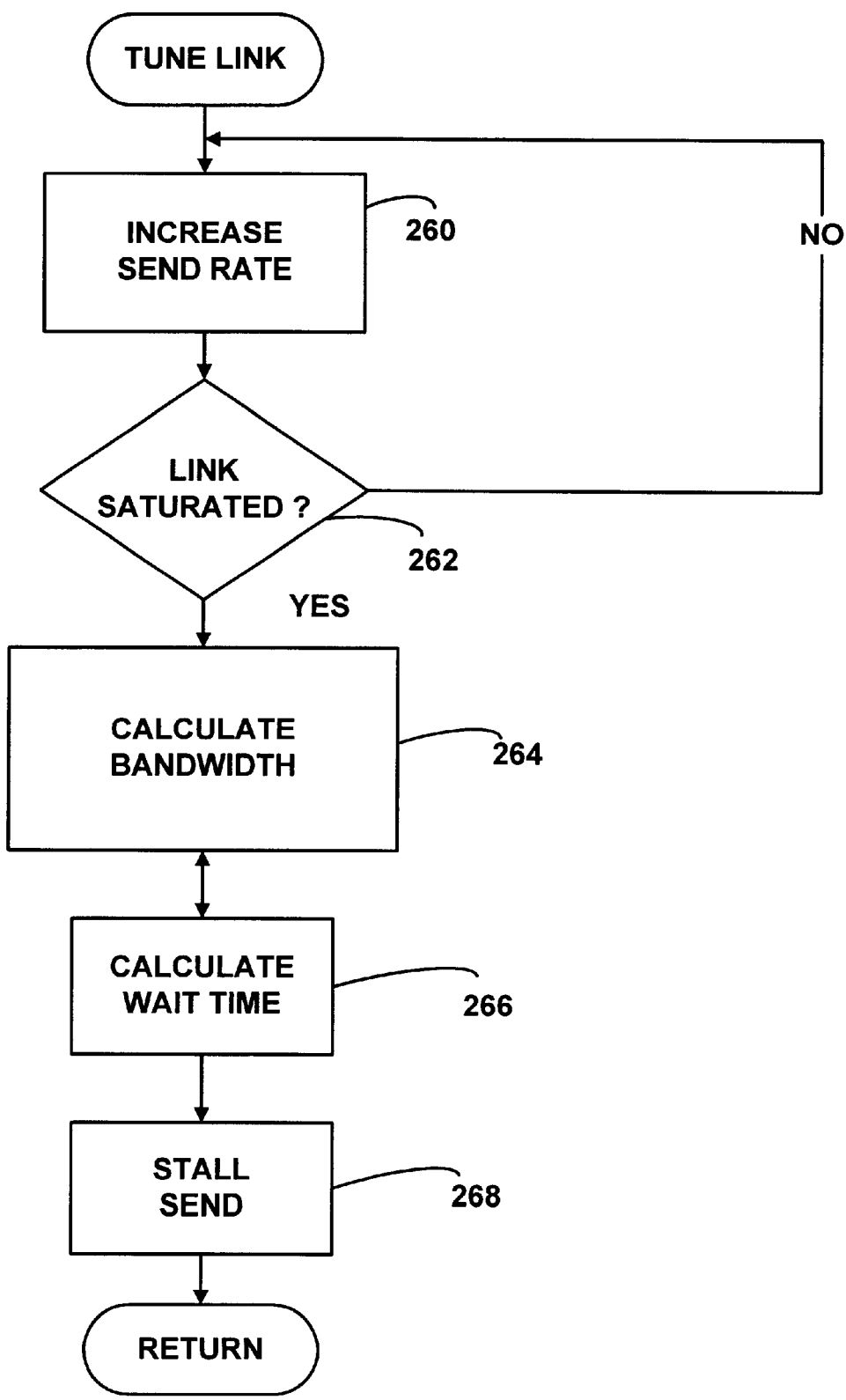
FIG. 15 is a flow diagram illustrating a method for tuning a network communication link to optimize the send rate over the link.

Using its ability to detect link saturation and compute bandwidth, the DP Protocol can optimize transfer over the network communication link by progressively increasing the send rate of messages until it detects link saturation, clearing the backlog of messages, and then setting the send rate at or near the calculated bandwidth. FIG. 15 is a flow diagram illustrating this process. The DP Protocol, as described above, implements a scheme for increasing the send rate progressively (260). When it detects link saturation (262), it proceeds to calculate the outbound bandwidth as described above (264). The DP protocol may then set the send rate at or near the calculated bandwidth. It then computes the time it needs to wait to clear the backlog based on its bandwidth calculation (266). To avoid immediately encountering link saturation, the DP protocol stalls sending any new messages until this wait time has elapsed (268).

The wait time is based on a combination of the outbound bandwidth, the latency of the link, and the amount of data sent but not acknowledged. A rough estimate of the wait time is the amount of unacknowledged data divided by the outbound bandwidth. However, this calculation does not take into account the outbound and return latencies. In particular, the local computer has sent data that the remote computer has not yet received. Additionally, the remote computer has received some data, but the local computer has not received the corresponding acknowledge messages for this data. To get a more accurate assessment of the amount of backlogged messages, the amount of un-acknowledged data should be reduced by the amount of data in the outbound and inbound paths. The amount of data in the outbound path is approximately the outbound latency multiplied by the outbound bandwidth. A similar calculation can be made for the inbound path.

As noted above, one way to compute the outbound latency is to take half the average roundtrip latency. The outbound latency may also be computed as the receive time in the remote computer (from the acknowledge message) less the local send time for a recently sent message. The data in the inbound path may be assumed to be the same as the data in the outbound path. Once the un-acknowledged data is reduced by the data in the outbound and inbound paths, the reduced number is divided by the outbound bandwidth to compute a more accurate wait time.

Exemplary Operating Environment

Figure 16:
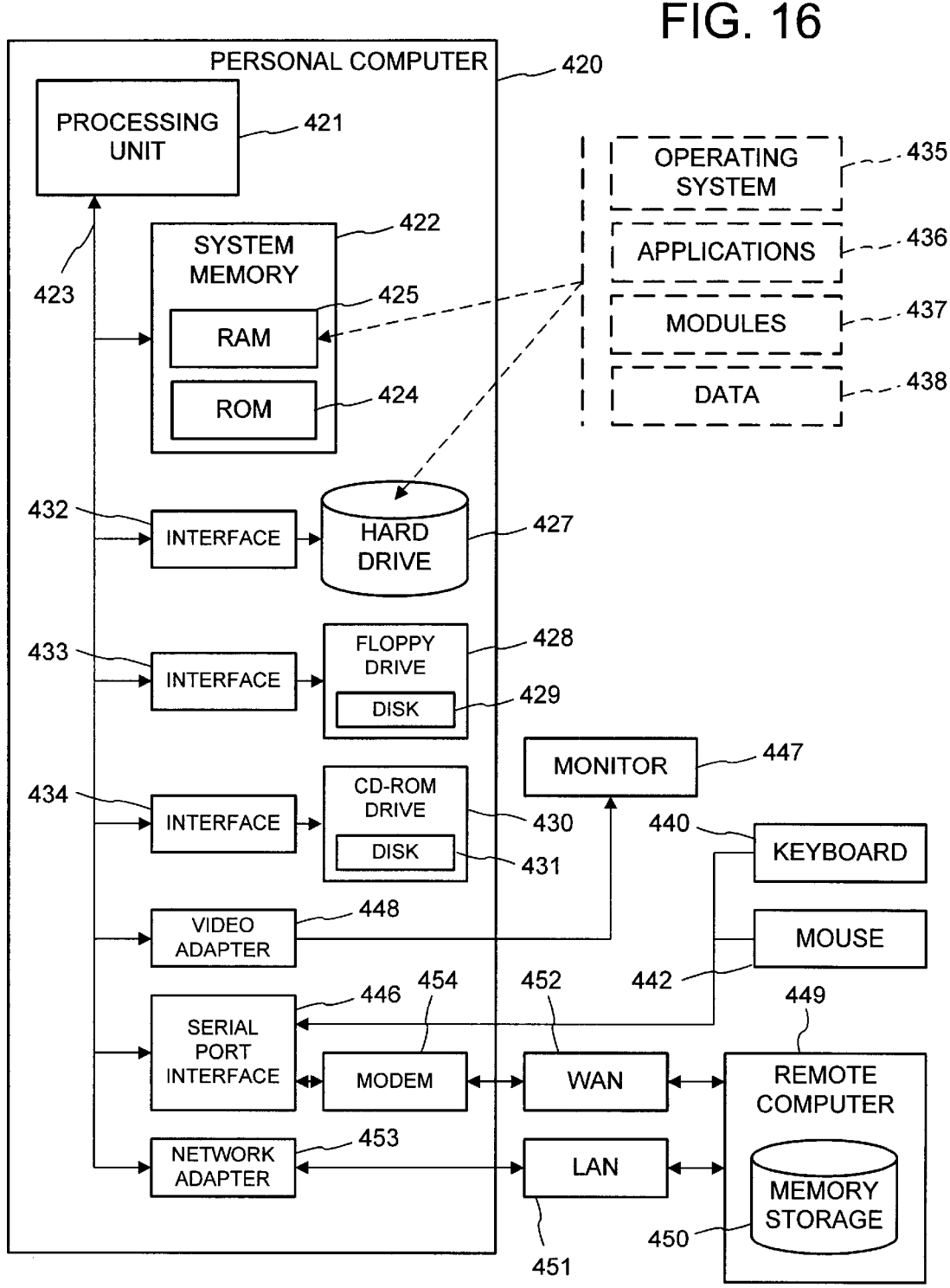
FIG. 16 is a diagram showing a general computing environment that can be used to practice the invention.

FIG. 16 and the following discussion are intended to provide a brief, general description of a suitable computing environment in which the invention may be implemented. The invention may be implemented in program modules comprising executable instructions that run on a computer.

Generally, program modules include routines, programs, components, data structures, etc. that perform particular tasks or implement particular abstract data types. The invention may be ported to other computer system configurations, including multiprocessor systems, microprocessor-based or programmable consumer electronics, minicomputers, mainframe computers, and the like. The invention may also be implemented in distributed computing environments where tasks are performed by remote processing devices that are linked through a communications network. In a distributed computing environment, program modules may be located in both local and remote memory storage devices.

FIG. 16 illustrates an example of a computer system that serves as an operating environment for the invention. The computer system includes a personal computer 420, including a processing unit 421, a system memory 422, and a system bus 423 that interconnects various system components including the system memory to the processing unit 421.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 424 and random access memory (RAM) 425. A basic input/output system 426 (BIOS), containing the basic routines that help to transfer information between elements within the personal computer 420, such as during start-up, is stored in ROM 424.

The personal computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions (program code such as dynamic link libraries, and executable files), etc. for the personal computer 420.

Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 425, including an operating system 435, one or more application programs 436, other program modules 437, and program data 438.

A user may enter commands and information into the personal computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port or a universal serial bus (USB).

A monitor 447 or other type of display device is also connected to the system bus 423 via an interface, such as a video adapter 448. In addition to the monitor, personal computers typically include other peripheral output devices (not shown), such as speakers and printers.

The personal computer 420 operates in a networked environment using logical connections to one or more remote computers, such as a remote computer 449. The remote computer 449 may be a server, a router, a peer device or other common network node, and typically includes many or all of the elements described relative to the personal computer 420, although only a memory storage device 450 has been illustrated in FIG. 16. The logical connections depicted in FIG. 16 include a local area network (LAN) 451 and a wide area network (WAN) 452. Such networking environments are commonplace in offices, enterprise-wide computer networks, intranets and the Internet.

When used in a LAN networking environment, the personal computer 420 is connected to the local network 451 through a network interface or adapter 453. When used in a WAN networking environment, the personal computer 420 typically includes a modem 454 or other means for establishing communications over the wide area network 452, such as the Internet. The modem 454, which may be internal or external, is connected to the system bus 423 via the serial port interface 446.

In a networked environment, program modules depicted relative to the personal computer 420, or portions of them, may be stored in the remote memory storage device. It will be appreciated that the network connections shown are exemplary and that other means of establishing a communications link between the computers may be used.

Conclusion

While the invention is described above in the context of a specific implementation, the scope of the invention is not limited to this implementation. A number of variations in the design are possible without departing from the scope of the invention. For example, the protocol described above is provided as part of an application programming interface with network-independent functions for sending and receiving messages to a remote computer. However, it is not necessary that the protocol be provided in an API. Alternatively, it could be implemented in an application program, an operating system, or network adapter driver software, for example.

The DP Protocol has a number of unique features such as maintaining a clock offset between local and remote computers on a network communication link, detecting link saturation, calculating outbound bandwidth, and tuning send rates based on detection of link saturation and the outbound bandwidth. Each of these capabilities is unique and may be used alone or in combination in a variety of different applications.

In calculating a clock offset between local and remote computers, the implementation of the DP Protocol makes certain design choices that need not be implemented in all methods or systems that incorporate the invention. For example, in the implementation described above, the clock bias is continually updated when a reduction in the bias is observed. Another approach is to maintain the bias as a short-term average over some time window of recently sent/acknowledged messages.

The precise criteria for detecting link saturation may be altered as well. A significant increase in the round-trip latency is a good indicator of link saturation. However, the criteria used to evaluate the significance of changes in the measured latency may vary. The implementation described above determines an increase to be significant based on a statistical analysis involving the average and standard deviation of the round-trip latency. The increase in round-trip latency may also be deemed significant if it increases more than some pre-determined constant value, for example. The implementation described above also uses a change in bias relative to the round-trip latency to isolate outbound link saturation. Each criterion is unique and may be used either alone or in combination to detect link saturation.

The above-implementation describes specific measures of a clock offset, round-trip latency, outbound/inbound bandwidth, backlogged messages, etc. The precise calculation of each of these measured values may vary. Clock offset may be measured based on a single pair of an outbound message and its corresponding acknowledge message or based on several pairs sent and received over time. Similarly, round-trip latency may be calculated from a single pair of an outbound message and its corresponding acknowledge message, or some average of multiple outbound/acknowledge message pairs. The inbound and outbound latencies may be computed using the local send and remote receive times of selected outbound/acknowledge message pairs or may be estimated from the average round-trip latency, for example. The measure of backlogged messages may be estimated as the unacknowledged messages or may be estimated by taking into account the inbound and outbound latencies.

The specific format of the messages used to record local send and remote receive times and data received on the remote computer may vary as well. The specific message protocol illustrated above is only one example. In particular, the request for an acknowledge may be implemented as part of a message header or as part of special type of message. The manner in which acknowledgement is requested for reliable and non-reliable messages may vary as explained above.

In view of the many possible embodiments to which the principles of the invention may be applied, it should be recognized that the illustrated implementations are only an example of the invention and should not be taken as a limitation on the scope of the invention. Rather, the scope of the invention is defined by the following claims. I therefore claim as my invention all that comes within the scope and spirit of these claims.

I claim:

1. A computer readable medium having software for tuning reliable and non-reliable channels on a single network communications link simultaneously, the link connecting a first computer with a second computer and having a variable bandwidth, the software comprising:
    an application protocol for sending messages on the reliable and non-reliable channels of a single network communications link, the application protocol being operable to send reliable messages over the link by requesting an acknowledge message for selected reliable messages and re-transmitting reliable messages that have been dropped, the application protocol being operable to send non-reliable messages for which selected non-reliable messages include a request for acknowledgement; and
    a non-reliable transport protocol in communication with the application protocol for sending both the reliable and non-reliable messages in response to requests from the application protocol over the single network communications link.

2. The computer readable medium of claim 1 wherein the selected reliable messages and selected non-reliable messages include:
    a message identifier, and a request for acknowledgement operable to prompt a remote computer to send an acknowledge message;
    wherein the acknowledge message includes:
    a message identifier used to match the reliable messages and selected non-reliable messages with corresponding acknowledge messages, a count of data received, and a remote receive time;
    and wherein the application protocol is operable to record a local send time for the selected reliable messages and selected non-reliable messages.

3. The computer readable medium of claim 2 wherein the application protocol is operable to maintain a measure of the clock offset between a clock on a local computer and a clock of a remote computer based on the local send time and remote receive times.

4. The computer readable medium of claim 2 wherein the application protocol is operable to detect link saturation on the network communications link.

5. The computer readable medium of claim 4 where the application protocol detects link saturation by maintaining a measure of round-trip latency and monitoring for a predefined increase in the round-trip latency.

6. The computer readable medium of claim 4 wherein the application protocol detects link saturation by maintaining a clock offset between a local computer clock and a remote computer clock and monitoring for a condition where a change in the clock offset is greater than a predetermined fraction of a measure of round trip latency, where the application protocol is operable to compute the measure of round trip latency based on the local send times and local receive times of the acknowledge messages.

7. The computer readable medium of claim 1 wherein the application protocol is operable to compute outbound bandwidth on the network communication link.

8. A method for tuning reliable and non-reliable channels on a single network communications link simultaneously, the link connecting a first computer with a second computer and having a variable bandwidth, the method comprising;

sending reliable messages over the reliable channel and non-reliable messages on the non-reliable channel from the first computer to the second computer while increasing the rate at which the messages are sent according to a predetermined scheme until saturation of the link is detected, the link saturation creating a backlog of messages across the link;

wherein reliable messages are sent with a request for acknowledgement and are re-transmitted when dropped, and wherein non-reliable messages are not re-transmitted when dropped;

calculating the bandwidth of the link in response to detecting that the link is saturated; reducing the message send rate from the first computer to the second computer over the link to the calculated bandwidth;

calculating a wait time to clear out the backlogged messages; and stalling issuance of messages from the first computer to the second computer over both the reliable and non-reliable channels from the first computer to the second computer over the link for a time equal to the calculated wait time.

9. The method of claim 8 including:

repeating the steps of claim 1 during communications from the first computer to the second computer to adjust the message send rate according to the calculated bandwidth.

10. The method of claim 8 wherein selected reliable messages and selected non-reliable messages are marked to request an acknowledge message from the second computer;

wherein an acknowledge message identifies a message being acknowledged, a remote receive time indicating a time the message being acknowledged was received in the second computer, and a count of data received in the remote computer at the remote receive time; and wherein the remote receive times and the count of data received are used to calculate the bandwidth of the link.

11. The method of claim 8 wherein:

outbound messages sent from the first computer to the second computer, including selected reliable messages and selected non-reliable messages, have a unique message number and a request for acknowledgement, a send time for the outbound messages is recorded in the first computer, and the outbound messages are acknowledged by a corresponding acknowledge message sent from the second computer to the first computer;

and further including:

calculating roundtrip latency by calculating a difference between a send time of an outbound message and a local receive time of the corresponding acknowledge message in the first computer; and averaging roundtrip latencies for outbound messages;

wherein link saturation is determined, at least in part, by observing a statistically-significant deviation between the average roundtrip latency and the roundtrip latency for an individual message.

12. The method of claim 11 wherein the statistically-significant deviation is at least three standard deviations.

13. The method of claim 11 wherein each acknowledge message includes a remote receive time indicating a time according to a clock on the second computer that the corresponding outbound message was received;

and further including:

determining whether an increase in the roundtrip latency is due to outbound latency by:

calculating a clock bias for outbound messages by calculating a difference between the send and remote receive times for the messages, calculating a change in the clock bias; and evaluating whether the change in the clock bias is more than a predetermined fraction of the roundtrip latency;

wherein an increase in roundtrip latency is considered to be attributable to an increase in outbound latency when the change in clock bias is more than the predetermined fraction of the roundtrip latency.

14. The method of claim 8, wherein the first computer is a local computer having a clock and the second computer is a remote computer having a clock, and wherein selected reliable messages and selected non-reliable messages have a unique identifier, and a request for acknowledgement, the method including:

recording for selected reliable messages and the selected non-reliable messages a local send time marking the time that each of the messages was sent from the local computer according to the local computer clock;

receiving acknowledge messages acknowledging receipt of reliable messages and non-reliable messages that requested acknowledgement, the acknowledge messages each including a remote receive time marking the time an acknowledged message was received according to the remote computer clock, an identifier identifying the acknowledged message, and a count of data received in the remote computer; and calculating outbound bandwidth of the link in the local computer by dividing an amount of data received in the remote computer as indicated in first and second acknowledge messages by a time period over which the data was received as indicated in the remote receive times of the first and second acknowledge messages.

15. The method of claim 8 wherein calculating the wait time includes: calculating an amount of un-acknowledged data sent from the first computer; and dividing the amount of un-acknowledged data by the calculated bandwidth of the link to determine the wait time.

16. The method of claim 15 further including:

before the dividing step, reducing the amount of un-acknowledged data by an estimate of outbound messages representing an amount of messages sent from the first computer yet not received in the second computer, and inbound acknowledge messages representing an amount of messages received in the second computer but whose acknowledge messages have not been received in the first computer.

17. The method of claim 16 wherein the estimate of outbound messages is computed as the calculated outbound bandwidth multiplied by a measure of outbound latency, and the estimate of inbound acknowledge messages is computed as a measure of the inbound bandwidth multiplied by a measure of inbound latency.

18. The method of claim 17 wherein the measure of outbound latency is half of an average roundtrip latency computed from the send times of outbound messages and receive times of inbound acknowledge messages corresponding to the outbound messages, and the measure of inbound bandwidth is the calculated outbound bandwidth.

19. A computer-readable medium having computer-executable instructions for performing the steps recited in claim 8.

20. A computer-readable medium having stored thereon a first data structure comprising;
   (a) a first data field including a message identifier;
   (b) a second data field including a message body; and
   (c) a third data field including an acknowledge field; and further including a second data structure comprising
   (d) a first data field including a message identifier;
   (e) a second data field including a count of data received at a second computer from a first computer; and
   (f) a third data field including a timestamp corresponding to the time a message is received on the second computer;

wherein outbound messages comprising the first data structure are sent between the first computer and the second computer, the second computer acknowledging receipt of the outbound messages when an acknowledge request is indicated in the acknowledge field by sending an acknowledge message comprising the second data structure to the local computer, the unique message identifier fields of the first and second data structures being used to match the outbound messages with the acknowledge messages.

* * * * *